United States Patent
Abraham et al.

(10) Patent No.: US 11,671,371 B2
(45) Date of Patent: Jun. 6, 2023

(54) SYNCHRONIZATION OF MULTI-STACK NODES

(71) Applicant: Musarubra US LLC, Plano, TX (US)

(72) Inventors: Anil Abraham, Karnataka (IN); Manikandan Kenyan, Saratoga, CA (US); Ashok Babu Thangamani, Bangalore (IN)

(73) Assignee: Musarubra US LLC, Plano, TX (US)

( * ) Notice: Subject to any disclaimer, the term of this patent is extended or adjusted under 35 U.S.C. 154(b) by 275 days.

(21) Appl. No.: 16/941,877

(22) Filed: Jul. 29, 2020

(65) Prior Publication Data
US 2022/0038377 A1 Feb. 3, 2022

(51) Int. Cl.
- *H04L 47/125* (2022.01)
- *H04L 45/02* (2022.01)
- *H04L 47/215* (2022.01)
- *H04L 45/021* (2022.01)

(52) U.S. Cl.
CPC ............ *H04L 47/125* (2013.01); *H04L 45/02* (2013.01); *H04L 45/021* (2013.01); *H04L 47/215* (2013.01)

(58) Field of Classification Search
CPC ..... H04L 47/125; H04L 45/02; H04L 45/021; H04L 47/215
See application file for complete search history.

(56) References Cited

U.S. PATENT DOCUMENTS

| | | | |
|---|---|---|---|
| 6,947,963 B1 * | 9/2005 | Agarwal | H04L 45/02 709/239 |
| 9,621,642 B2 * | 4/2017 | Ganesh | H04L 67/1002 |
| 11,088,937 B1 * | 8/2021 | Zhou | H04L 45/02 |
| 2005/0091396 A1 * | 4/2005 | Nilakantan | H04L 45/04 709/232 |
| 2005/0220109 A1 * | 10/2005 | Sudo | H04L 45/02 370/392 |
| 2011/0082928 A1 * | 4/2011 | Hasha | H04L 45/02 709/224 |
| 2014/0043964 A1 * | 2/2014 | Gabriel | H04L 61/2007 370/357 |
| 2014/0372567 A1 * | 12/2014 | Ganesh | H04L 67/1002 709/219 |
| 2015/0350087 A1 * | 12/2015 | Hong | H04L 41/0806 370/230 |
| 2018/0323891 A1 * | 11/2018 | Dubey | H04L 45/02 |
| 2021/0160548 A1 * | 5/2021 | Ziskind | H04N 21/631 |

* cited by examiner

*Primary Examiner* — Nam T Tran
(74) *Attorney, Agent, or Firm* — Patent Capital Group

(57) ABSTRACT

There is disclosed in one example a method of a work node synchronously load balancing to a multi-node service having an expected maximum of n work nodes, including: provisioning a flow table having m bucket groups, $m \geq 1$, the bucket groups including n slots each; enumerating a static integer self-identification $id_0$; initializing the flow table with $id_0$ in each slot; performing a discovery iteration, including: discovering a peer device; enumerating a static integer identification $id_x$ for the peer device; assigning $id_x$ to each slot corresponding to a home position for the peer device; and load balancing slots not assigned to a home position according to a deterministic algorithm; and discovering additional nodes and performing discovery iteration for the additional nodes.

20 Claims, 14 Drawing Sheets

SYNCHRONIZATION OF MULTI-STACK NODES

FIELD OF THE SPECIFICATION

This application relates in general to computer networking, and more particularly, though not exclusively, to providing a system and method for synchronization of multi-stack nodes.

BACKGROUND

In order to provide increased throughput, as well as redundancy to prevent system-wide failure, modern data centers and enterprise networks may include multiple nodes that perform an identical function.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
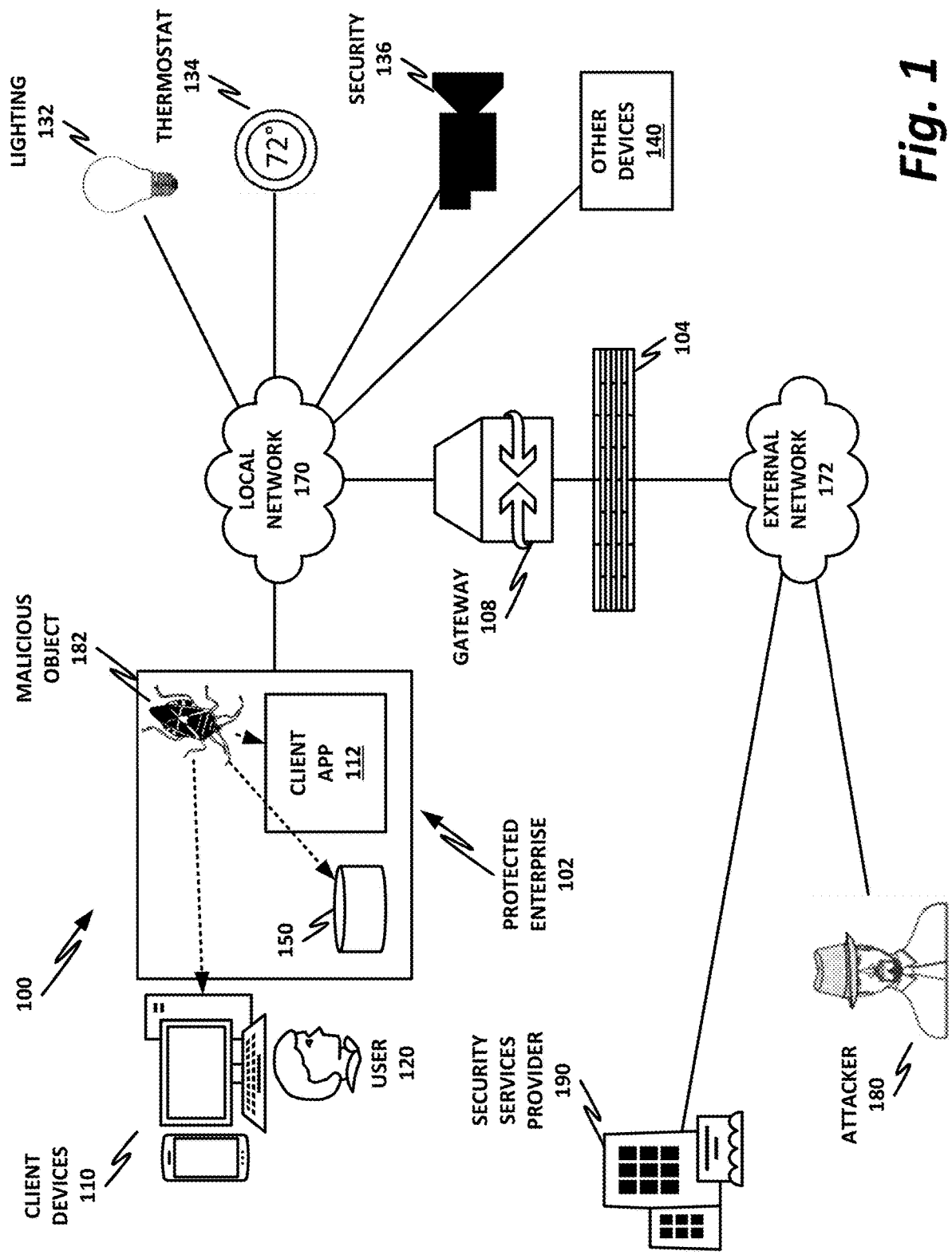
FIG. 1 is a block diagram of selected elements of a security ecosystem.

In an example, there is disclosed a method of a work node synchronously load balancing to a multi-node service having an expected maximum of n work nodes, comprising: provisioning a flow table having m bucket groups, $m \geq 1$, the bucket groups comprising n slots each; enumerating a static integer self-identification $id_0$; initializing the flow table with $id_0$ in each slot; performing a discovery iteration, comprising: discovering a peer device; enumerating a static integer identification $id_x$ for the peer device; assigning $id_x$ to each slot corresponding to a home position for the peer device; and load balancing slots not assigned to a home position according to a deterministic algorithm; and discovering additional nodes and performing discovery iteration for the additional nodes.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In a data center or enterprise network, it is common to have multiple nodes providing an identical function. The multiple nodes may be provided for purposes of increasing the available throughput by handling many connections in parallel, and/or for the purpose of redundancy. For example, in an illustrative embodiment, eight nodes may be provided that perform an identical function, such as deep packet inspection (DPI) or some other network service. These eight nodes could be physical appliances, or they could be virtual machines in a data center. DPI will be used throughout the present specification as a nonlimiting illustration of a function that such nodes may perform, but it should be understood that the teachings disclosed herein may be extended to apply to any suitable node that provides a network service.

In an illustrative embodiment, a plurality of n nodes may share a common trunk, with k connections available on the trunk for each node. Thus, the total number of connections on the trunk is n×k, and the total number of processing queues available (i.e., the total number of instances of the processing service) is n×k. In another embodiment, each connection services multiple receive queues p on a node, so that the total number of instances is n×k×p.

Because the nodes share a common trunk, any of the nodes may assign an incoming packet to any connection on the trunk, whether on its own node or on a different node. This assignment is commonly based on a five-tuple consisting of [source IP, source port, destination IP, destination port, protocol]. For example, if a client on IP 6.7.8.9 is making a hypertext transfer protocol (HTTP) connection to a server on IP 1.2.3.4, then the client will assign a random port number as the source port and build a five-tuple, such as [6.7.8.9:54729, 1.2.3.4:80, TCP]. A hash of this tuple may be used to assign the flow to a "bucket," which ultimately maps to a destination connection and its associated receive queue on the processing service. Because the hash is deterministic, the assigned destination queue will always be identical.

This system works well, as long as incoming packets always hit the same physical appliance. Because this physical appliance maintains its own flow table, it will always route the packet to the same receive queue, and thus maintain flow coherency. However, problems may be encountered if the routing changes. For example, as a simple matter of load balancing, or for other reasons, an internet service provider (ISP) may switch over from one connection to another. This may result in traffic being received on a different physical or virtual appliance than it was originally received on. When this happens, flow coherency may be lost, because the appliances may have different routing tables.

Although the appliances use the same algorithm for hashing and for assigning flows to a particular "bucket," the assignment of those buckets to connections and receive queues may be different, because the nodes may discover one another in a different order. For example, in a four-node configuration, node 1 may first discover node 3, then node 2, then node 4. Based on this order of discovery, it will build its own flow tables that assign particular connections to particular buckets. Node 2, on the other hand, may discover the other nodes in the order 3, 1, 4. Node 3 may discover nodes in the order 1, 4, 2. Node 4 may discover nodes in the order 2, 1, 3. Thus, although they all use the same algorithm, because the nodes were discovered in a different order, the bucket assignments will be different between the various nodes.

To maintain flow coherency, the flow tables between the different nodes may need to be synchronized. However, synchronization is a nontrivial issue. For example, it is possible for the nodes to communicate with each other, export their flow tables to one another, and then attempt a reconciliation of the flow tables. But in doing this, they may encounter various problems. For example, the nodes will have to elect among themselves a primary node, and the other nodes will need to reconcile their tables to the primary node table. If the primary node is lost, then another primary node may need to be elected, and the process may resume. This is an expensive process in terms of communication and in terms of compute power, and is also error-prone.

An improved method includes an algorithm of the present specification, in which nodes converge toward a common routing or flow table, regardless of the order in which other nodes are discovered. In this case, the flow tables on each node may initially be out of synchronization as nodes spin up and discover one another, but over time as the process iterates, the tables converge by following the same deterministic algorithm, which is independent of the order in which nodes are discovered, and instead relies on static integer identifications assigned to (or derived from properties of) the node. The algorithm disclosed herein assigns a "home" position to each node in the configuration. For example, if each node has its own trunk with four connections, and if there are eight nodes in the system, then a flow table may be built with four groups of eight. Each node will ideally converge toward a routing table of the form:

| [1, 2, 3, 4, 5, 6, 7, 8] | [1, 2, 3, 4, 5, 6, 7, 8] |
|---|---|
| [1, 2, 3, 4, 5, 6, 7, 8] | [1, 2, 3, 4, 5, 6, 7, 8] |

As new nodes come online and are discovered by other nodes, each node will reserve the "home" location for its corresponding node. For example, when node 1 comes online, it has not discovered any other nodes, and it may initialize its routing table by populating each of the 32 available slots with its own identification:

| [1, 1, 1, 1, 1, 1, 1, 1] | [1, 1, 1, 1, 1, 1, 1, 1] |
|---|---|
| [1, 1, 1, 1, 1, 1, 1, 1] | [1, 1, 1, 1, 1, 1, 1, 1] |

If node 1 then discovers node 7, it will assign node 7 traffic to its home location in the routing table (the 7th position in each group). Node assignments in their "home" slots are shown in boldface, for clarity:

| [1, 1, 1, 1, 1, 1, 7, 1] | [1, 1, 1, 1, 1, 1, 7, 1] |
|---|---|
| [1, 1, 1, 1, 1, 1, 7, 1] | [1, 1, 1, 1, 1, 1, 7, 1] |

This assignment initially results in traffic handling that is out of balance. In this case, ⅞ths of traffic still flows through node 1, while ⅛th of traffic flows through node 7. Next, balancing is provided by a deterministic algorithm that cycles through the discovered nodes (in this case, [1,7]), such as in ascending numerical order. This is performed only for "visitor" locations (i.e., locations not already assigned to a home slot). This is done while maintaining each node's home assignment, and then iterating through "visitor" slots in ascending numerical order. For example, in the previous illustration, slots 1 and 7 of each group are occupied "home" slots, and thus will not change. Slots 2, 3, 4, 5, 6, and 8 are visitor slots and can be changed.

Taking the first group as an example, in ascending numerical order, slot 2 is assigned node 1, while slot 3 is assigned node 7. The available nodes have now been exhausted, so the process cycles back. Slot 4 is assigned node 1, slot 5 is assigned node 7, and so on. When the process reaches the end of a group, it continues on with the next group, continuing to cycle through discovered nodes for visitor slots only. Home slots are left undisturbed, and not counted in the cycling method:

| [1, 1, 7, 1, 7, 1, 7, 7] | [1, 1, 7, 1, 7, 1, 7, 7] |
|---|---|
| [1, 1, 7, 1, 7, 1, 7, 7] | [1, 1, 7, 1, 7, 1, 7, 7] |

The routing table is now more nearly balanced.

If node 3 is discovered next, then node 3 is assigned to its home location in the routing table.

| [1, 1, 3, 1, 7, 1, 7, 7] | [1, 1, 3, 1, 7, 1, 7, 7] |
|---|---|
| [1, 1, 3, 1, 7, 1, 7, 7] | [1, 1, 3, 1, 7, 1, 7, 7] |

The process then iterates again. Positions 1, 3, and 7 are left alone in each group, because they are already assigned to their home positions. Assignments are then made by cycling through [1,3,7] in visitor positions only:

| [1, 1, 3, 3, 7, 1, 7, 3] | [1, 7, 3, 1, 3, 7, 7, 1] |
|---|---|
| [1, 3, 3, 7, 1, 3, 7, 7] | [1, 1, 3, 3, 7, 1, 7, 3] |

Node 4 is discovered next and assigned to its home slots:

| [1, 1, 3, 4, 7, 1, 7, 3] | [1, 7, 3, 4, 3, 7, 7, 1] |
|---|---|
| [1, 3, 3, 4, 1, 3, 7, 7] | [1, 1, 3, 4, 7, 1, 7, 3] |

And slots are load balanced by cycling through [1,3,4,7]:

| | |
|---|---|
| [1, 1, 3, 4, 3, 4, 7, 7] | [1, 1, 3, 4, 3, 4, 7, 7] |
| [1, 1, 3, 4, 3, 4, 7, 7] | [1, 1, 3, 4, 3, 4, 7, 7] |

Node 5 is discovered next and assigned to its home slots:

| | |
|---|---|
| [1, 1, 3, 4, 5, 4, 7, 7] | [1, 1, 3, 4, 5, 4, 7, 7] |
| [1, 1, 3, 4, 5, 4, 7, 7] | [1, 1, 3, 4, 5, 4, 7, 7] |

Visitor slots are then load balanced from [1,3,4,5,7]:

| | |
|---|---|
| [1, 1, 3, 4, 5, 3, 7, 4] | [1, 5, 3, 4, 5, 7, 7, 1] |
| [1, 3, 3, 4, 5, 4, 7, 5] | [1, 7, 3, 4, 5, 1, 7, 3] |

Node 6 is discovered next and assigned to its home slots:

| | |
|---|---|
| [1, 1, 3, 4, 5, 6, 7, 4] | [1, 5, 3, 4, 5, 6, 7, 1] |
| [1, 3, 3, 4, 5, 6, 7, 5] | [1, 7, 3, 4, 5, 6, 7, 3] |

Visitor slots are then load balanced from [1,3,4,5,6,7]:

| | |
|---|---|
| [1, 1, 3, 4, 5, 6, 7, 3] | [1, 4, 3, 4, 5, 6, 7, 5] |
| [1, 6, 3, 4, 5, 6, 7, 7] | [1, 1, 3, 4, 5, 6, 7, 3] |

Node 2 is discovered next and assigned to its home slots:

| | |
|---|---|
| [1, 2, 3, 4, 5, 6, 7, 3] | [1, 2, 3, 4, 5, 6, 7, 5] |
| [1, 2, 3, 4, 5, 6, 7, 7] | [1, 2, 3, 4, 5, 6, 7, 3] |

Visitor slots are then load balanced from [1,2,3,4,5,6,7]:

| | |
|---|---|
| [1, 2, 3, 4, 5, 6, 7, 1] | [1, 2, 3, 4, 5, 6, 7, 2] |
| [1, 2, 3, 4, 5, 6, 7, 3] | [1, 2, 3, 4, 5, 6, 7, 4] |

Finally, node 8 is discovered, and assigned to its home slots.

| | |
|---|---|
| [1, 2, 3, 4, 5, 6, 7, 8] | [1, 2, 3, 4, 5, 6, 7, 8] |
| [1, 2, 3, 4, 5, 6, 7, 8] | [1, 2, 3, 4, 5, 6, 7, 8] |

No visitor slots remain, so the flow table is now fully balanced.

As illustrated here, the nodes may initially be out of synchronization as they discover one another in a random order. But as the nodes iterate through the process and discover all of the nodes, they will ultimately converge toward the same routing table. Furthermore, if one node is down, then they will still converge toward the same routing table, even if it is not the ideal routing table of

| | |
|---|---|
| [1, 2, 3, 4, 5, 6, 7, 8] | [1, 2, 3, 4, 5, 6, 7, 8] |
| [1, 2, 3, 4, 5, 6, 7, 8] | [1, 2, 3, 4, 5, 6, 7, 8] |

For example, if node 3 goes down or is never discovered, then the nodes will all converge toward:

| | |
|---|---|
| [1, 2, 1, 4, 5, 6, 7, 8] | [1, 2, 2, 4, 5, 6, 7, 8] |
| [1, 2, 3, 4, 5, 6, 7, 8] | [1, 2, 4, 4, 5, 6, 7, 8] |

Each node may go through different iterations to get there, as they discover other nodes in a different or random order. But after sufficient time, the flow tables will match, without the nodes having to perform an explicit synchronization or reconciliation.

Also note that the nodes could also use common node assignments in each group, rather than "spreading out" the rebalancing across all groups. For example, assuming again that node 3 is down, all nodes could converge toward:

| | |
|---|---|
| [1, 2, 1, 4, 5, 6, 7, 8] | [1, 2, 1, 4, 5, 6, 7, 8] |
| [1, 2, 1, 4, 5, 6, 7, 8] | [1, 2, 1, 4, 5, 6, 7, 8] |

This algorithm is somewhat simpler, but at the expense of possibly achieving inferior load balancing. For example, in this illustration, node 1 receives eight flows, while all other nodes receive four flows.

Advantageously, this provides an algorithm by which the nodes converge toward a common routing table without having to communicate with one another, without having to elect a primary node, and without having to perform expensive reconciliation operations. The algorithm can be easily adapted to any number of nodes, and to any number of groups, which may optionally be based on the connections per node. Essentially, the nodes build an n-tuple, where n is the number of nodes, and the number of n-tuples in the routing table, m, is the number of groups.

Advantageously, this ensures that when a node is discovered, packets are bucketized to their home position where possible, and the next iteration then helps to provide a more balanced flow. This will not always provide a perfectly balanced flow, but a perfectly balanced flow is not always possible. However, the method provides convergence, and also provides a more balanced flow than simply assigning nodes to their home positions and leaving the other assignments in the default configuration. Furthermore, because each node follows the same deterministic process as it discovers other nodes, the routing tables converge without communication between the nodes.

Thus, in a stack of n identical systems or nodes, services such as DPI may be performed on packets and flows, and each node may maintain its own flow distribution table. The flow refers to a network identified by the 5-tuple of source and destination IP, source and destination port, and protocol. The flow distribution table is a key-value pair with the flow ID as the key, and the processing node as the value. The flow distribution table on each node achieves load balancing of the incoming flows to all the nodes within the stack, including itself, to maintain a fair distribution of flows and equal usage of nodes in the stack. Each node can independently distribute the flow to any of the nodes in the stack based on its flow distribution table.

As the flow distribution table is built dynamically as nodes are discovered (e.g., a new node addition, or a node coming up after a failure), there is some amount of randomness used to achieve a fair flow distribution table. Thus, the flow tables on each node may differ. Because of this, depending on which node the flow arrives at, the outcome of a flow table lookup will differ between nodes, and thus, the node to which the flows eventually load balance will also differ. This can become a problem when new nodes are added to the stack or failed nodes recover, as there may be significant redistribution of flows when the flow table is dynamically altered. This may not be desirable for stateful packet processing systems like IDS, IPS, or FireWire, which expect flow affinity to be maintained to achieve cross-packet inspection continuity. However, using the teachings of the present specification, a consistent flow table can be maintained between the different nodes without them needing to communicate with one another, as the flow tables will converge toward a common flow table.

A system and method for providing synchronization of multi-stack nodes will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190. Protected enterprise 102 could be a home network, an enterprise network, or some other suitable network.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. In some embodiments, gateway 108 could be a simple home router, or could be a sophisticated enterprise infrastructure including routers, gateways, firewalls, security services, DPI, web servers, or other services. In cases where gateway 108 includes a plurality of devices in a cluster or a stack, it may be necessary to load balance between these devices. The clustered or stacked devices may be identical or substantially identical to one another, and in some cases may be configured in a high-availability configuration, wherein a redundant cluster or redundant connections are provided, and may take over functions if one stack or cluster fails.

Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
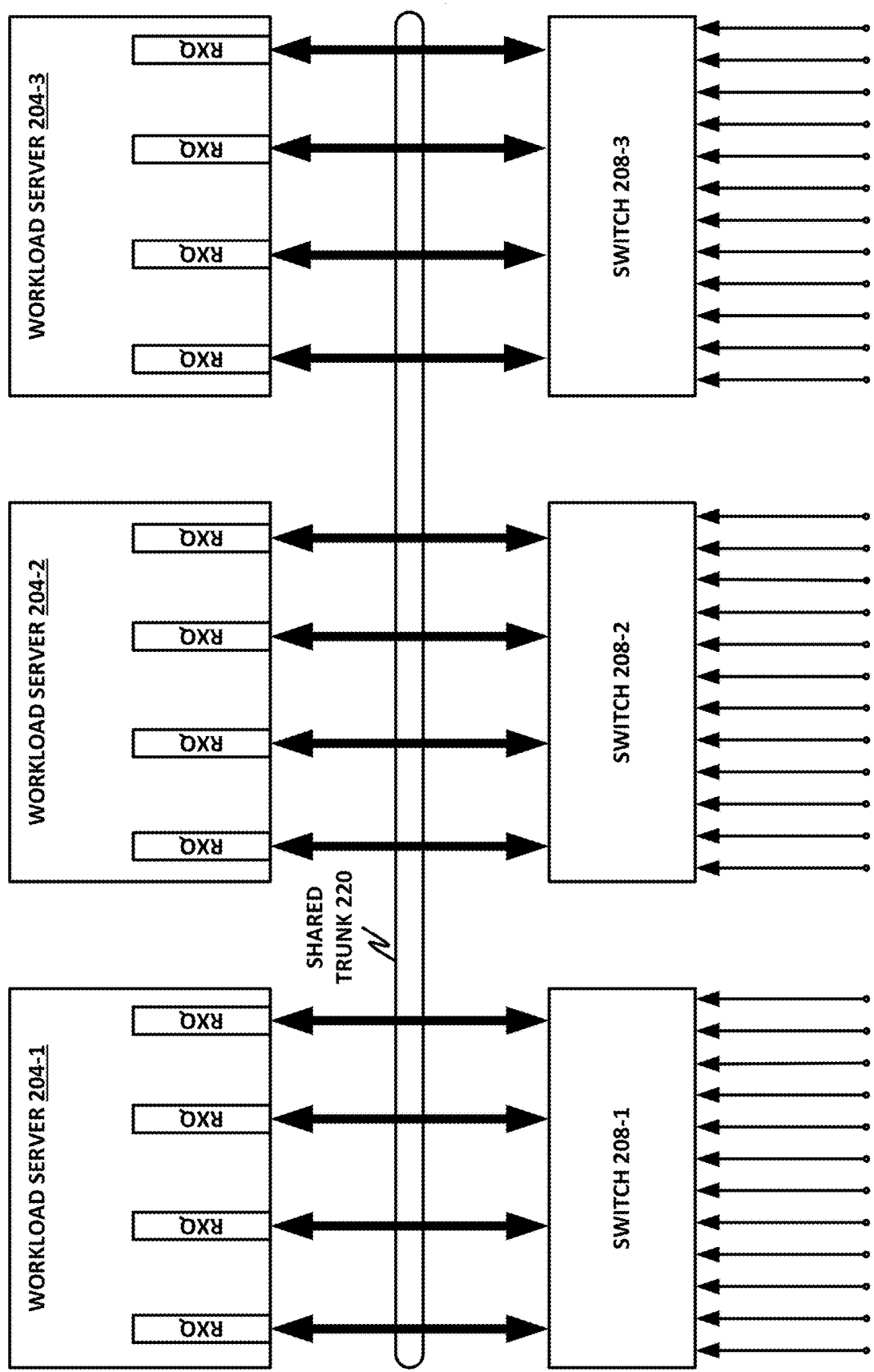
FIG. 2 is a block diagram of a cluster environment.

FIG. 2 is a block diagram of a cluster environment, in which three workload servers (or nodes) provide a unified workload. Specifically, workload servers 204-1, 204-2, and 204-3 are provided in this illustration. Each workload 204 includes a plurality of receive queues, such as four separate receive queues. For example, workload servers 204 may be dedicated hardware workload servers with four ingress interfaces, and four instances of the same function. These three workload servers, with four instances each, have a common shared trunk 220. The three workload servers together provide a total of 12 instances of the service. The service could be, for example, a firewall, a DPI engine, billing and logging statistics, network shaping, or other services. These workload servers are serviced by a plurality of switches, namely switches 208-1, 208-2, and 208-3. The three switches themselves have a number of ingress interfaces. For example, in this illustration, each switch has 12 ingress interfaces.

In operation, each switch 208 receives incoming traffic, and performs a first-level load balancing or hashing function, in which the traffic is assigned to one of a number of traffic groups.

Note that in the illustrated embodiment, each connection interfaces to exactly one receive queue. However, this is not necessarily the only or even the best configuration. In some cases, there may be additional receive queues, such as two to three times more receive queues, so that each connection on shared trunk 220 goes to one of two or three receive queues. In this case, another level of hashing may be performed by the connection itself, in which the receive queue to receive the traffic is selected according to a hashing algorithm.

It is seen here that three discrete workload servers handle the actual workload. In this case, although it is not necessary, there are a plurality of connections to each workload, and specifically in this case, there are 12 total connections on shared trunk 220.

Thus, a flow table may be constructed. As a useful example, the flow table may essentially share the architecture of the physical connections. However, this is not necessary, and the structure of the flow table has great flexibility.

In this case, the flow table is divided into certain bucket groups. A bucket is simply a logical construct in which a hashed tuple can be placed. For example, each flow includes a source IP, source port, destination IP, destination port, and protocol. A hash of this 5-tuple may be used for bucketizing packets. Once the packet is bucketized, it is assigned to a corresponding slot in the flow table. For example, the flow table corresponding to FIG. 2 may be:

[1, 2, 3] [1, 2, 3] [1, 2, 3] [1, 2, 3]

This flow table may be considered "balanced," because traffic is evenly distributed between each of the three workloads, and indeed, traffic is distributed such that each connection on shared trunk 220 receives a single slot in the flow table. However, this is a nonlimiting example only.

In other configurations, the traffic can be divided in other ways. For example, if there were 16 workload servers with only one connection each, traffic could be divided into a single vector of 16 slots. If there are eight nodes with two connections each, then the flow table could include two groups of eight. It could also include, for example, three groups of eight, four groups of eight, eight groups of eight, or some other configuration. An advantage of the teachings of the present specification is that if the number of slots in a group matches the number of workload servers, then each workload server can be assigned a "home" position within the groups. For example, each workload server may have an integer numeric designation that is unique within the cluster, and that remains static, regardless of when the device is discovered. This could be based on, for example, a hash of a media access control (MAC) address, a device name, or some other static data. If the unique identifier is not a simple integer between 1 and the number of devices, then it can be normalized to an integer in that range. For example, workload server 204-1 can be assigned device ID 1, workload server 204-2 can be assigned device ID 2, and workload server 204-3 can be assigned device ID 3. These designations remain static, regardless of what order switches 208 discover the devices. For example, if switch 208-1 first discovers workload server 204-3, the workload server will still receive the ID of 3, even though it was discovered first.

In this case, the third slot within each bucket group for the flow table is the "home" position for device 3. Similarly, the home position for workload server 204-2 is the second slot in each flow table. The home position for workload server 204-1 in each group is the first slot in that group. Thus, in the example above, not only is the traffic balanced between 12 slots, but in each group, the home slot is populated with the device ID that belongs to that home slot. In other words, in each group, device 1 is in slot 1, device 2 is in slot 2, and device 3 is in slot 3.

The switches may have the goal of ultimately populating the flow table so that each device is assigned to its home slot in each group. Note that this does not necessarily mean that traffic in a particular slot flows to the associated device. For example, if the four groups correspond to the 12 connections on shared trunk 220, and if the flow table aligns with the 12 interfaces, then the slot 1 traffic will flow to interfaces 1, 4, 7, and 10, respectively. Slot two traffic will flow respectively to interfaces 2, 5, 8, and 11. The slot 3 traffic for each group will flow respectively connections 3, 6, 9, and 12.

Thus, the "home" position does not necessarily map to the individual device, but rather is a useful convention for providing load balanced traffic. In the case where the traffic buckets are divided into a number of groups, with the number of slots per group corresponding to the expected number of workload servers in the cluster, then it can be assumed that when all nodes are discovered by each switch, and the flow tables are populated with the appropriate home positions, then the traffic buckets will be evenly balanced and the flow tables for each switch will match.

However, in real world implementations, one or more devices may fail or be absent, or there may be other irregularities in their configuration. Furthermore, there is a finite time that it takes each switch to discover the various nodes. If the stack fails over to a new stack during this time when the flow table has not reached its steady state, then there may be dropped packets or lost flows. This is particularly true in the case of a stateful service such as DPI or firewalls, in which it matters which flow an individual packet belongs to. Thus, there are described below deterministic algorithms for providing intermediate load balancing and population of slots by rotating through discovered nodes in increasing numerical order to load balance until additional nodes are discovered, such that each node fills its designated home slot. Note that this is also useful in the case where the number of nodes is less than the expected maximum number of nodes. For example, if FIG. 2 represents a cluster that is expected to have four nodes, but one of the nodes has failed so that there are only three left, then the flow table may be divided into groups of four, with four slots per group. In this case, because the fourth node is down, it will not be discovered by the switches. However, using the deterministic algorithm described below, the switches will nevertheless populate the flow table with nodes 1, 2, and 3 in their home positions, and then fill in the fourth slot by rotating through the discovered nodes in numerical order. Using this deterministic algorithm, the various switches will still tend toward a common steady state, regardless of the order in which nodes are discovered, and regardless of whether the fourth node is ever discovered.

Figure 3:
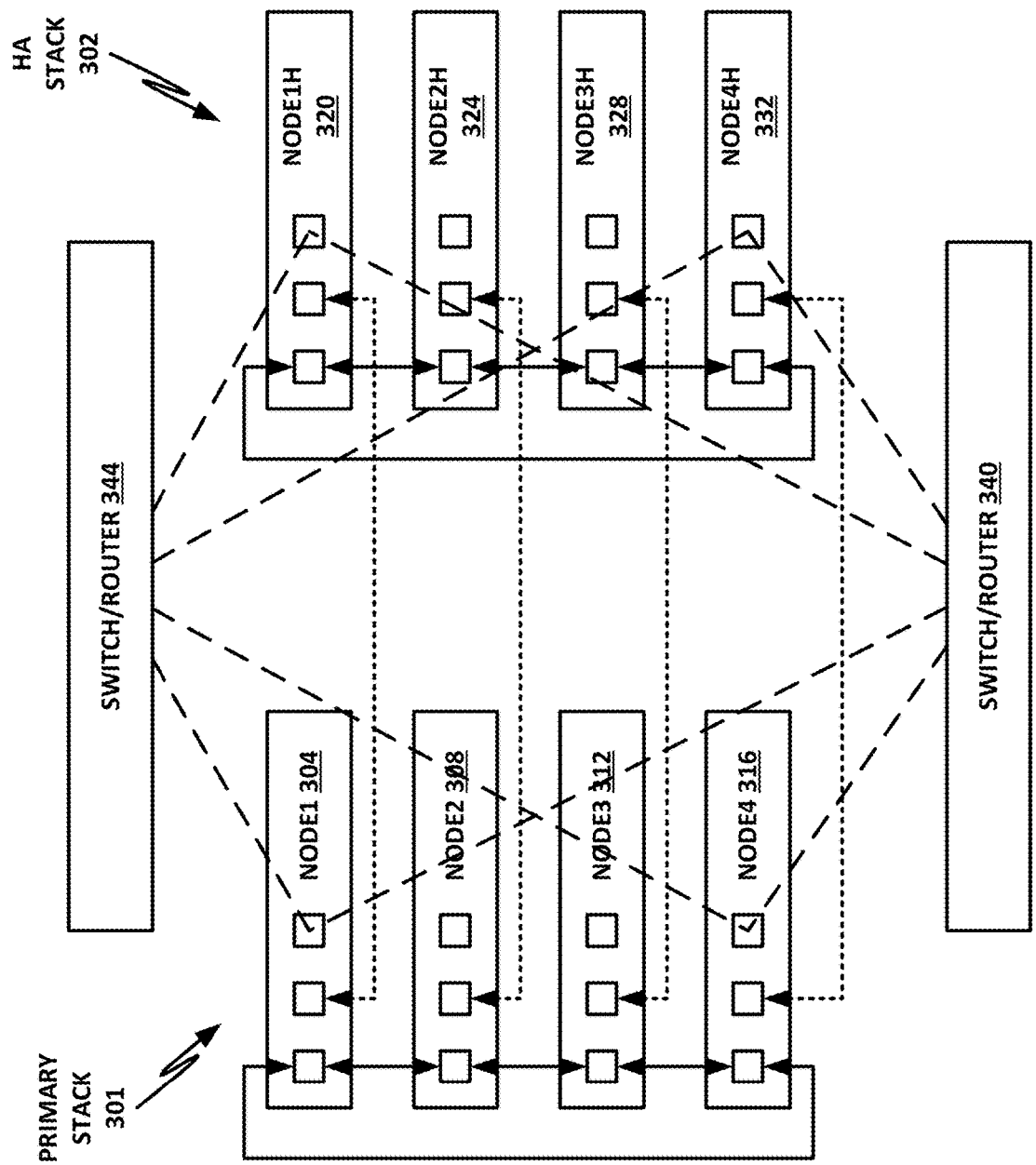
FIG. 3 is a block diagram of selected elements of network infrastructure.

FIG. 3 is a block diagram of selected elements of network infrastructure. FIG. 3 illustrates high-availability, which is another context in which synchronization may be important.

In this example, a primary stack 301 and a high-availability (HA) stack 302 are both provided. These stacks are serviced by switches or routers 340 and 344.

In this case, switches 340, 344 maintain connections to node 1 304 and node 4 316. For example, the connection to node 1 may be the primary path, while the connection to node 4 may be a redundancy path.

As illustrated, the nodes have connections to one another, and to nodes in HA stack 302. Thus, node 1H 320 can remain synchronized to node 1 304. Node 2H 324 can remain synchronized to node 2 308. Node 3H 328 can remain synchronized to node 3 312. Node 4H 332 may remain synchronized to node 4 316. Although these nodes may synchronize state information, they may not necessarily synchronize their flow tables, and indeed, it may not be cost-effective in terms of network and computer usage for them to synchronize their network states.

If one of the nodes in primary stack 301 fails, then as a failover mechanism, HA stack 302 takes over the workload function. The failure in primary stack 301 can then be addressed, and once it is addressed, it may then begin functioning as the HA stack, while stack 301 may continue functioning as the primary stack.

If the flow tables between the nodes are not synchronized, then in the case of a failover, although the workload function itself is redundantly provided, there may be loss of state information or misdirected flows, which can lead to network interruptions. Thus, in this example, it is also beneficial to maintain flow table synchronization between primary stack 301 and HA stack 302.

Figure 4:
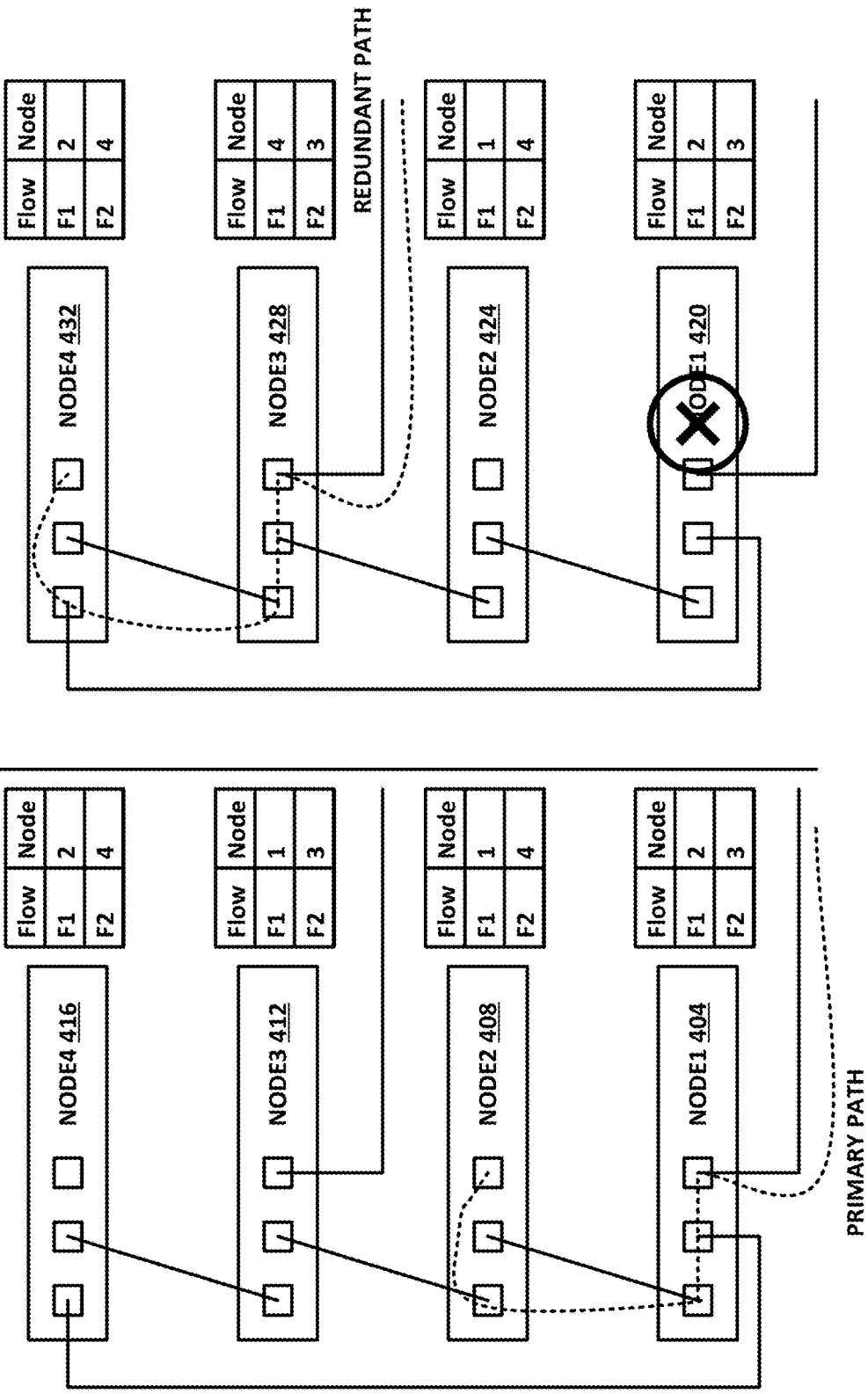
FIG. 4 is a block diagram of selected elements of a workload cluster or stack.

FIG. 4 is a block diagram of selected elements of a workload cluster or stack. This cluster includes node 1 404, node 2 408, node 3 412, and node 4 416. Illustrated on the left is the stack before node 1 fails, and on the right is illustrated the stack after node 1 fails.

A primary path is provided into node 1 404, while a redundant path is provided into node 3 412. This represents the primary ingress path for traffic. Once traffic enters the ingress path, it may be load balanced to any of the other nodes. In some cases, this may be a first-level load balancing that simply offloads the packet to one of the four nodes, and then one of the four nodes will perform the final load balancing that will assign the packet to a particular node and receive queue for final processing.

In this illustration, the nodes may be configured to perform DPI of flows or packets, or some other stateful or stateless network service. In the case of a stateful network service, it may be necessary to maintain packet consistency to avoid dropped packets and interruptions in the workflow. As illustrated, each node may have its own flow distribution table. Illustrated here are examples of small snippets of the flow distribution table. As can be seen here, if a deterministic algorithm as taught in the present specification is not used, then the state of the flow tables may be inconsistent. For example, the flow table of node 4 416 maps flow F1 to node 2 and flow F2 to node 4. The flow table of node 3 412 maps flow F1 to node 1 and flow F2 to node 3. The flow table of node 2 408 maps flow F1 to node 1 and flow F2 to node 4. The flow table of node 1 404 maps flow F1 to node 2 and flow F2 to node 3.

Thus, when flow 1 arrives at node 1 404 via the primary path, it is load balanced to node 2 408, according to the entry in the flow table.

However, on the right-hand side of the illustration, it is shown that node 1 may fail. In this case, the ingress interface switches from the primary path on node 1 to the secondary path on node 3. As seen, the flow table for node 3 is different from the flow table for node 1. Furthermore, the flow table may change in response to changed network conditions. For example, on the left-hand side, flow F1 maps to node 1. However, because node 1 has failed, flow F1 now maps to node 4. Thus, a packet arrives on the redundant path to node 3, and after hashing it is identified as flow F1. According to the updated flow table, node 3 412 routes the packet to node 4 416 for substantive processing.

Because node 1 404 had previously been routing this flow to node 2 408, node 4 416 does not have the correct flow state information for the flow. This means that the flow is essentially dropped. Any work previously performed on the flow may be lost, and a new connection may have to be made. Not only does this result in network inconsistencies, but it can also result in reduced security.

Figure 5:
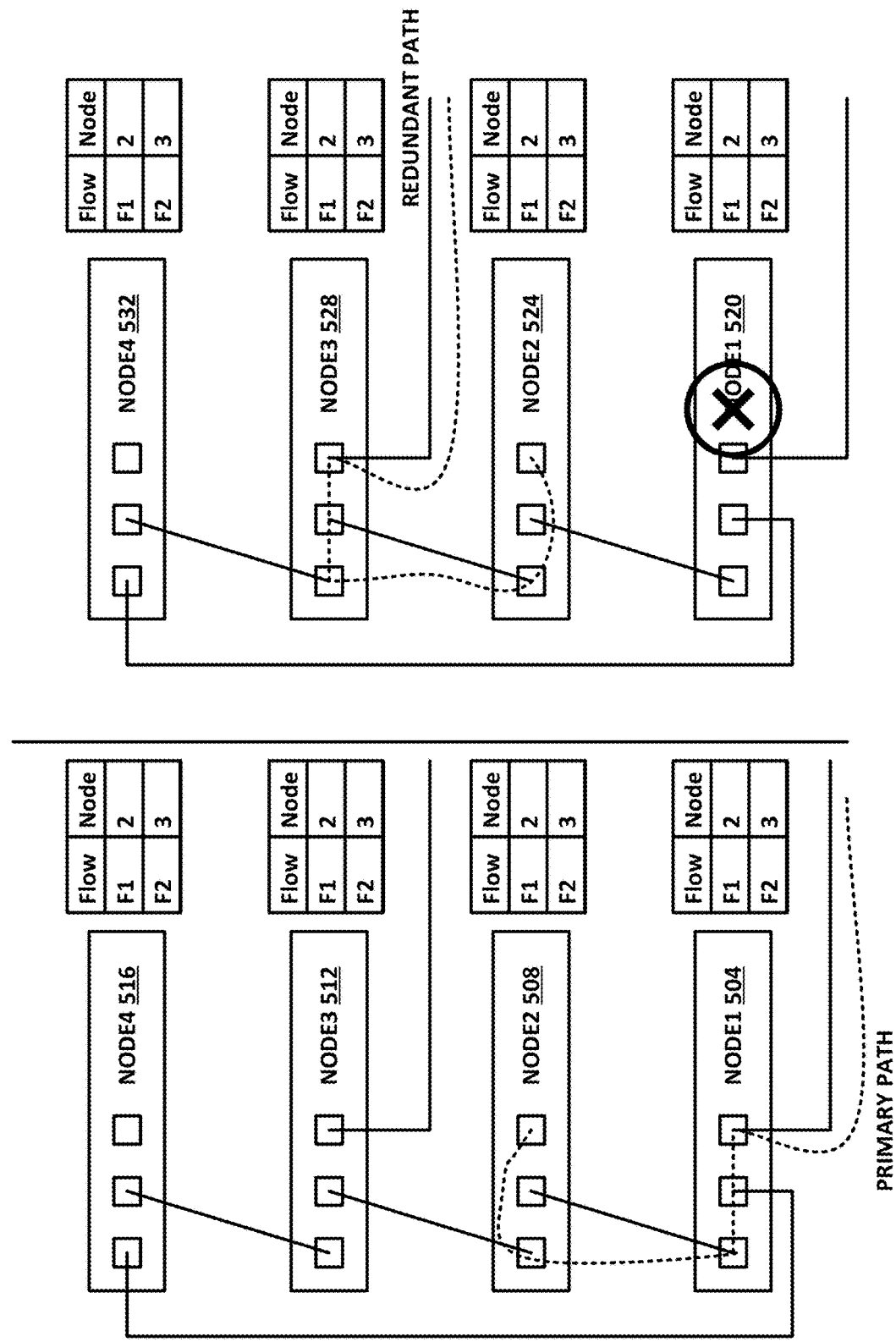
FIG. 5 is a further block diagram of selected elements of a workload cluster or stack.

FIG. 5 is an illustration of a similar network stack, in which the nodes use a deterministic algorithm to maintain consistent flow tables.

For example, flows may be identified by a 5-tuple that includes source and destination IP address, source and destination port, and protocol. The flow distribution table may be a key-value pair, with the flow ID as the key and the processing node as the value. The flow distribution table in each node achieves load balancing of the incoming flows to all the nodes within the stack, including itself. This maintains a fair distribution of flows and a roughly equivalent usage of all nodes in the stack. Each node can independently distribute the flow to any of the nodes in the stack, based on its flow distribution table.

The flow distribution table is built dynamically as nodes in the stack are discovered. For example, a node is discovered when it is added, or when it comes back up after a failure. In some embodiments, there may be some amount of randomness applied to achieve a relatively fair flow distribution.

Because each node builds its flow table independently of the other nodes, the flow tables on each node may differ. Even in the case where the nodes use the same algorithm, the algorithm may be based on the order in which nodes are discovered, and therefore the flow tables may end up being different. This may be true even if the algorithm is deterministic, because there is no common framework for referring to the nodes. Therefore, because the flow tables may be different, a packet may be load balanced differently, depending on which node the flow arrives at. In other words, the network termination point may determine the outcome of the flow table lookup, and the outcome may be different between different nodes.

This is not necessarily a problem, as long as the state of the cluster remains consistent. For example, a packet coming into node 1 and identified as flow F1 is load balanced to node 2. As shown in FIG. 4, it's possible that a different node (e.g., node 2 408) would load balance this packet to node 1, instead. However, as long as the state of the network remains unchanged, the packet will never be sent to node 2 for load balancing. As long as the network state remains consistent, the existing flow tables work and are deterministic. Thus, flow F1 will always be sent to node 1, until something changes.

Therefore, so long as a packet flow continues arriving at the same ingress port and is directed to the same node, it will always go to the same receive queue on the same node, and that queue will continue handling the flow. Thus, stateful processing can be achieved without interruption. This is achieved regardless of the fact that the flow would be directed to a different node, given the opportunity.

However, as illustrated in FIG. 4, there can be a problem when a node fails. A similar problem can occur when a node is added to the stack. In these cases, there may be a significant redistribution of the flows as the flow tables are dynamically altered. This redistribution may be undesirable for stateful packet processing systems like IDS, IPS, Firewall, and similar. These stateful systems expect flow affinity to be maintained to achieve cross-packet inspection continuity. FIG. 5 illustrates an embodiment that obviates the issues illustrated in FIG. 4.

FIG. 5 illustrates a similar network configuration, in which the nodes are programmed to operate on the determinative algorithm disclosed in the present specification. This determinative algorithm converges to a common flow table, even when the nodes are discovered in different order. This provides a predictable flow distribution. This predictable flow distribution table creation scheme ensures that the individual nodes eventually converge so that they have identical entries. Identical flow tables ensure that flows get distributed to the same node, irrespective of which node they arrive on first.

This provides advantages in supporting state redundancy features on stateful packet processing systems, and in other such configurations. Unlike simple hashing schemes, the determinative algorithm provided herein ensures that identical hash tables are created on individual nodes in the stack. This helps to achieve port-level redundancy with stateful procedures, such as DPI. This can also provide continuity in a node stack.

In the configuration of FIG. 5, the flow tables converge. When new nodes are added to the stack, or when nodes are lost, the flow tables may be temporarily mismatched. But eventually, they will converge again toward the common flow table.

The algorithm disclosed provides a concept of slots, where a slot or a range of slots may be earmarked for particular nodes in the flow table. The slot or slots earmarked for a particular node are referred to as "home slots." Note that the designation of a slot as a home slot is on a per-node basis. In other words, a home slot is a home slot only for the designated node.

When a node is still undiscovered by other nodes in the cluster or stack, its home slots may be occupied by other nodes in the stack. In this case, the slot is treated as a "visitor slot," meaning it is available for being filled by other nodes until it can be filled as a home slot.

When other nodes in the stack (i.e., not the home nodes) are used to fill empty visitor slots, they may be filled according to a deterministic algorithm, such as by cycling through node IDs of nodes currently discovered in the stack. These node IDs may be used in ascending order.

Once a node is discovered, initially, only the range of slots earmarked for it (i.e., its home slots) are evicted so that they can be filled with the node ID for the newly discovered node. This ensures that once the nodes are discovered and converge, they all have the same flow table. However, even filling in nodes to their home slots may not always achieve effective load balancing, particularly in the case where not all nodes have yet been discovered. Thus, after the home slots have been filled in, a load balancing iteration may occur in which remaining visitor slots are filled in by cycling through the discovered node identifiers in ascending numerical order.

In the illustration of FIG. 5, the nodes are labeled 1, 2, 3, 4. These labels may remain static, regardless of the order in which the nodes are discovered. For example, if node 4 is discovered first, it is nevertheless designated as node 4. As discussed above, these node IDs may be assigned based on static properties of the node itself, may be assigned by an orchestrator or an administrator, or may be assigned by some other mechanism. In this illustration, the node IDs are provided as an integer value between 1 and 4. These are used because there are four nodes. However, it is also possible that these node IDs may be normalized from other identification information, so that the final integer value between 1 and 4 need not necessarily be the original identification of the node. It is sufficient that each node can discover or derive the integer identification from the available information.

In the example flow table illustrated here, the flow table has slots, which are divided into four groups. This is an example only. It could also, for example, have 32 slots divided into eight groups of four, or any other suitable combination. The operative principle for an embodiment of the present method is that each group has four available slots, corresponding to the expected four nodes, which is, for example, the expected maximum number of nodes in the stack.

Node-1 flow table: [1, 1, 1, 1], [1, 1, 1, 1], [1, 1, 1, 1], [1, 1, 1, 1]—All the slots are set to node-1 (local) since none of the nodes are discovered at this point.

Node-1 flow table (node-3 is discovered):
Iteration 1—Fill in the node-3 slots leaving node-1 slots unchanged—[1, 1, 3, 1], [1, 1, 3, 1], [1, 1, 3, 1], [1, 1, 3, 1]; Node 1-12 slots: Node 3-4 slots, hence rebalance the table.
Iteration 2—Fill in the remaining slots in the order [1,3] (ascending order of node IDs in the stack)—[1, 1, 3, 3], [1, 1, 3, 3], [1, 1, 3, 3], [1, 1, 3, 3]; Stack is balanced and 50% of the flows are redistributed as expected, since a new node is added to a single node stack.

Node-1 flow table (node-4 is discovered now in addition to 1 and 3):
Iteration 1—Fill in the node-4 slots leaving other slots unchanged—[1, 1, 3, 4], [1, 1, 3, 4], [1, 1, 3, 4], [1, 1, 3, 4]→N1: 8, N3: 4, N4: 4; hence, rebalance.
Iteration 2—Fill in the remaining slots in the order [1, 3, 4]→[1, 1, 3, 4], [1, 3, 3, 4], [1, 4, 3, 4], [1, 1, 3, 4]—N1: 6, N3: 5, N4: 5; less than 50% of flows rehashed.

Node-1 flow table (node-2 is discovered now in addition to 1, 3 and 4):
Iteration 1—Fill in the node-2 slots leaving other slots unchanged—[1, 2, 3, 4], [1, 2, 3, 4], [1, 2, 3, 4], [1, 2, 3, 4]→N1: 4, N2: 4, N3: 4, N4: 4; stack is balanced. Skip iteration 2-25% of flows rehashed.

Note that the above algorithm populates the flow table for node 1 only. Other nodes in the stack may walk through the same operations, possibly in a different sequence because they may discover the different nodes in a different sequence.

Thus, the other nodes in the stack may initially have different flow tables, because nodes may be discovered in a different sequence. However, over time, the flow tables will converge toward commonality. When nodes leave, their home slots may first be evicted, and then filled with other nodes in ascending numerical order, as discussed above. The algorithm disclosed here could be extended to any number of nodes. For example, a stack that has four, six, eight, 16, 32, 64, or any number of nodes could be populated with the same algorithm, by providing groups wherein each group has a number of slots corresponding to the number of nodes in the stack. Furthermore, it is possible to have a flow table wherein there is only one group of n nodes.

As illustrated in FIG. 5, the flow tables after a time converge toward commonality. Thus, across all four nodes, flow F1 is assigned to node 2, and flow F2 is assigned to node 3. Thus, on the right side of the FIGURE, when node 1 fails and its traffic is now directed via the redundant path to node 512, operations are not disrupted. Because both node 1 and node 3 assign flow F1 to node 2, node 3 512 will direct the flow to node 2 508. Because node 2 508 has the correct state information from the flow, it will remain stateful, and processing will continue as normal. Note that any flows assigned to node 1 would be disrupted in this case, but that is not avoidable in the case of a single stack. In the case where availability requirements mandate that flows like this should not be disrupted, a high-availability configuration as illustrated in FIG. 3 could be used, instead.

Figure 6:
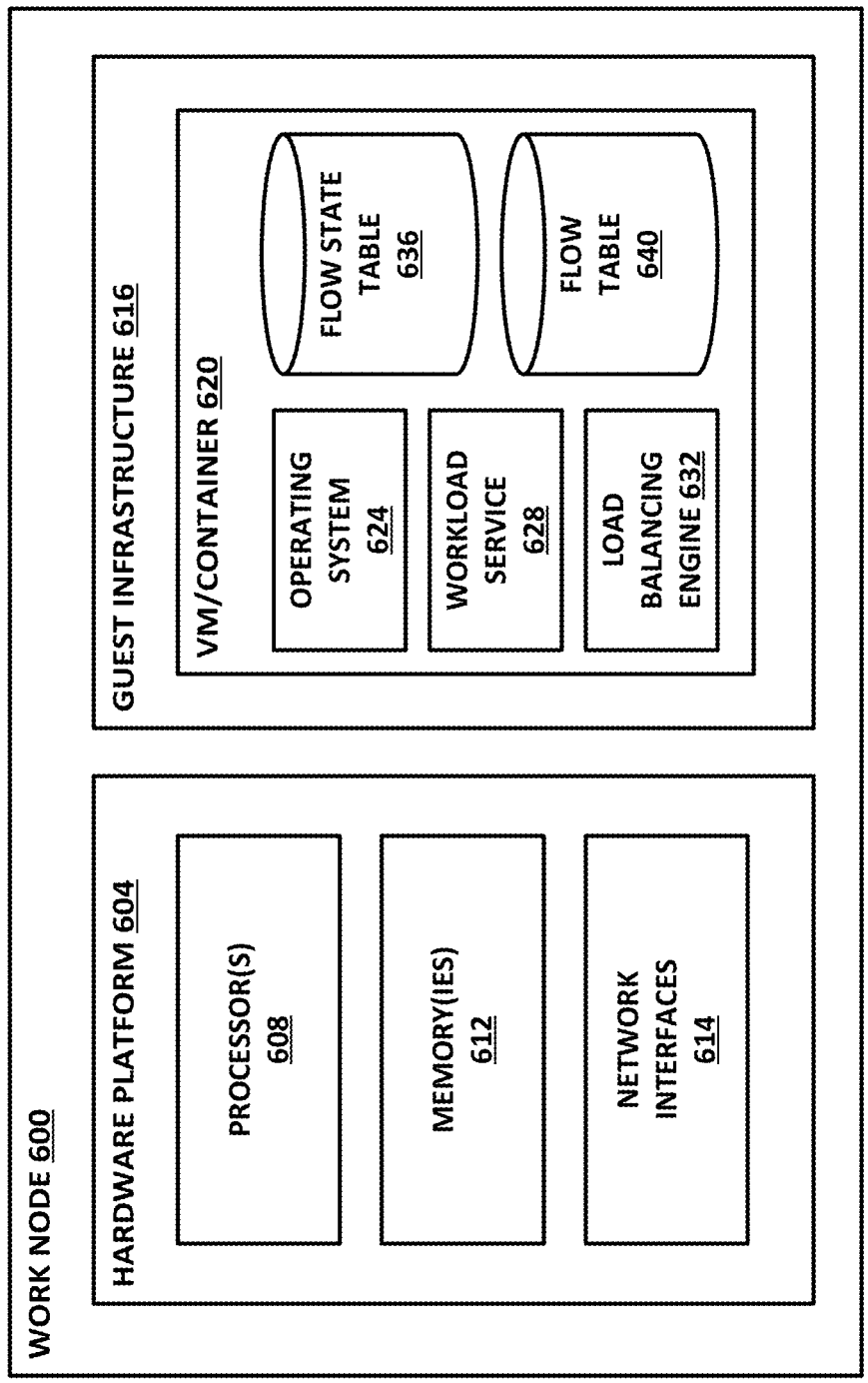
FIG. 6 is a block diagram of a work node.

FIG. 6 is a block diagram of a work node 600. Work node 600 in this example provides both load balancing to itself and to other nodes, as well as providing a substantive workload service. As shown throughout this specification, other configurations are possible, such as having separate switches.

Work node 600 includes a hardware platform 604. Hardware platform 604 provides hardware such as one or more processors 608, one or more memories 612, and one or more network interfaces 614. It should be noted that work node 600 could be a dedicated or standalone hardware server, or some other configuration, such as a virtual machine or a container. Thus, configurations may differ in whether or how the software infrastructure interacts with hardware platform 604.

In some cases, a guest infrastructure 616 may include, for example, a virtualization layer or a container daemon. This may provide some isolation, and some siloing of different devices. In cases where work node 600 is a standalone appliance, a guest infrastructure 616 may not be necessary.

In cases where a guest infrastructure 616 is used, then substantive functions of work node 600 may be provided on one or more virtual machines and/or containers 620. These may provide a software ecosystem that includes, for example, an operating system 624, a workload service 628, and a load balancing engine 632. The software infrastructure may also include data stores, such as a packet state table 636, and a flow table 640. Packet state table 636 may be used to maintain coherency in stateful packet flows.

Flow table 640 may include a table for hashing certain flows into buckets, for example, according to a 5-tuple. Flow table 640 may also include a number of slots, including flow table slots configured according to the teachings of the present specification.

Figure 7:
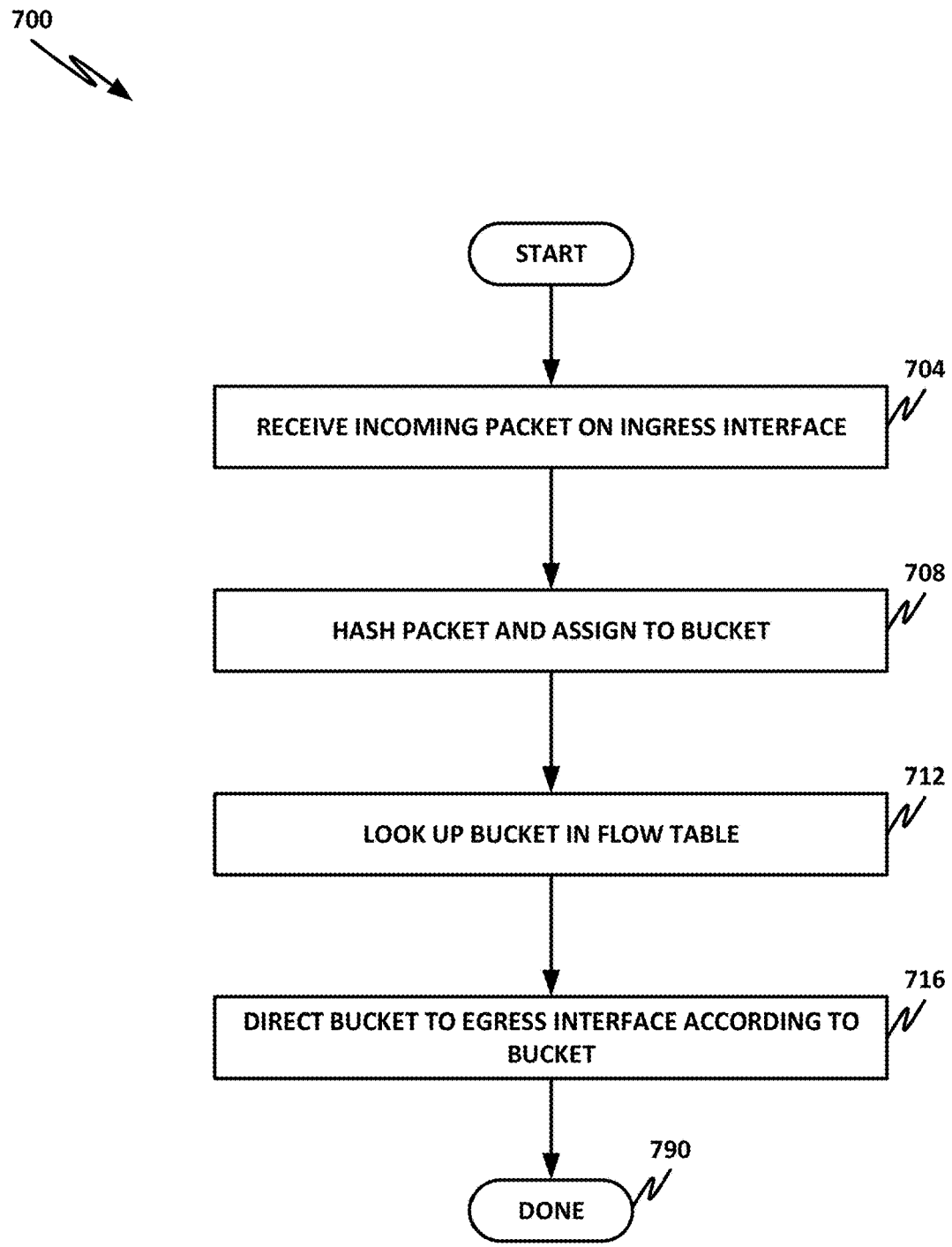
FIG. 7 is a flowchart of a method.

FIG. 7 is a flowchart of a method 700 that may be performed by a module, such as load balancing engine 632.

In this example, at block 704, the load balancer receives an incoming packet on an ingress interface.

At block 708, it may hash the packet or perform some other operation to assign the packet to a bucket. To maintain consistency, the operation may be deterministic, which is why hashes are popular for load balancing algorithms.

In block 712, the load balancer looks up the hash in the flow table to see which bucket the flow should be assigned to.

In block 716, the load balancer directs the packet to the egress interface associated with the selected bucket. In block 790, the method is done.

Figure 8:
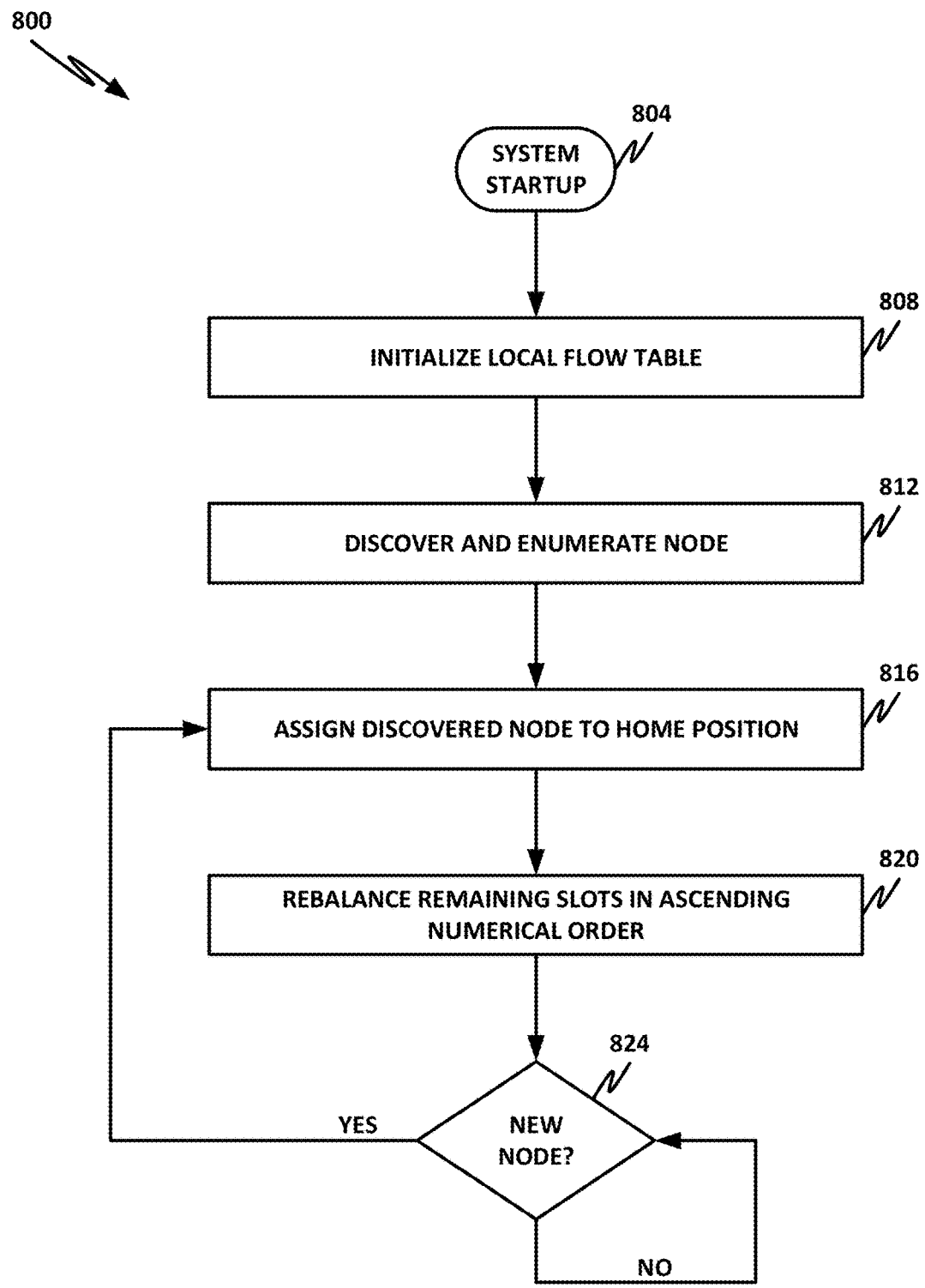
FIG. 8 is a flowchart illustration of an example deterministic algorithm.

FIG. 8 is a flowchart that illustrates an example of a deterministic algorithm that may be used to converge flow tables across various nodes over time. Method 800 may be performed by load balancing engine 632 of FIG. 6, or by any other suitable module.

At block 804, the system starts up. It is now available to perform both load balancing functions and workload functions, if they are cohosted together on the same device.

In block 808, the system initializes its local flow table. For example, to initialize the local flow table, the device may discover, derive, or receive its own device identifier. It then populates each slot in its flow table with that device identifier. This is because, at this point in the method, the system only knows about itself.

In block 812, the system discovers another node in the network, the stack, or the cluster. Because it has discovered another node, that node is also now available to perform functions.

In block 816, the system assigns the newly discovered node to its home position. For example, if the newly discovered node is identified as "node 3," then the system may populate the third slot in each group with a pointer to node 3. The flow table is now populated with node 3 in its home slot, and node 2 in every other slot. Note that this includes having node 2 in the home slots for node 2. However, assuming a four-node cluster, slots or positions 1 and 4 in each group are still simply populated with 2, which is the default assignment they received upon initialization.

In block 820, the system improves the load balancing by rebalancing the remaining slots in ascending numerical order. For example, at this point there are two discovered nodes, namely node 2 and node 3. The system will now cycle through nodes 2 and 3 in ascending numerical order (e.g., 2 then 3), looping back to the beginning when the list has been exhausted (i.e., after assigning 3, the system loops or cycles back to node 2). In a simple two-member list, this means simply alternating between the two available nodes.

However, the list could be much larger, such as four nodes, eight nodes, 16 nodes, or any other number of nodes.

Thus, in the first cluster, after assigning node 3 to its home position, the cluster is [2, 2, 3, 2]. Nodes 2 and 3 are in their home positions in the second and third slots of this cluster. Cycling through the remaining nodes, node 2 is assigned to slot 1. In this case, node 2 was previously assigned to slot 1, so no changes are made at this point. Next, node 4 is to be populated. The system goes up the list in ascending numerical order to node 3, and populates slot 4 with node 3. The system then continues on with the other groups in the flow table.

Once the iterative load balancing is completed, in block 824, the system may begin a polling loop, where it polls for the discovery of new nodes. As long as new nodes are not discovered, it may continue polling until a new node is discovered, or until the system shuts down.

If a new node is discovered, then control flows back to block 816, and the slot population and rebalancing algorithm of blocks 816 and 820 is repeated.

Figure 9:
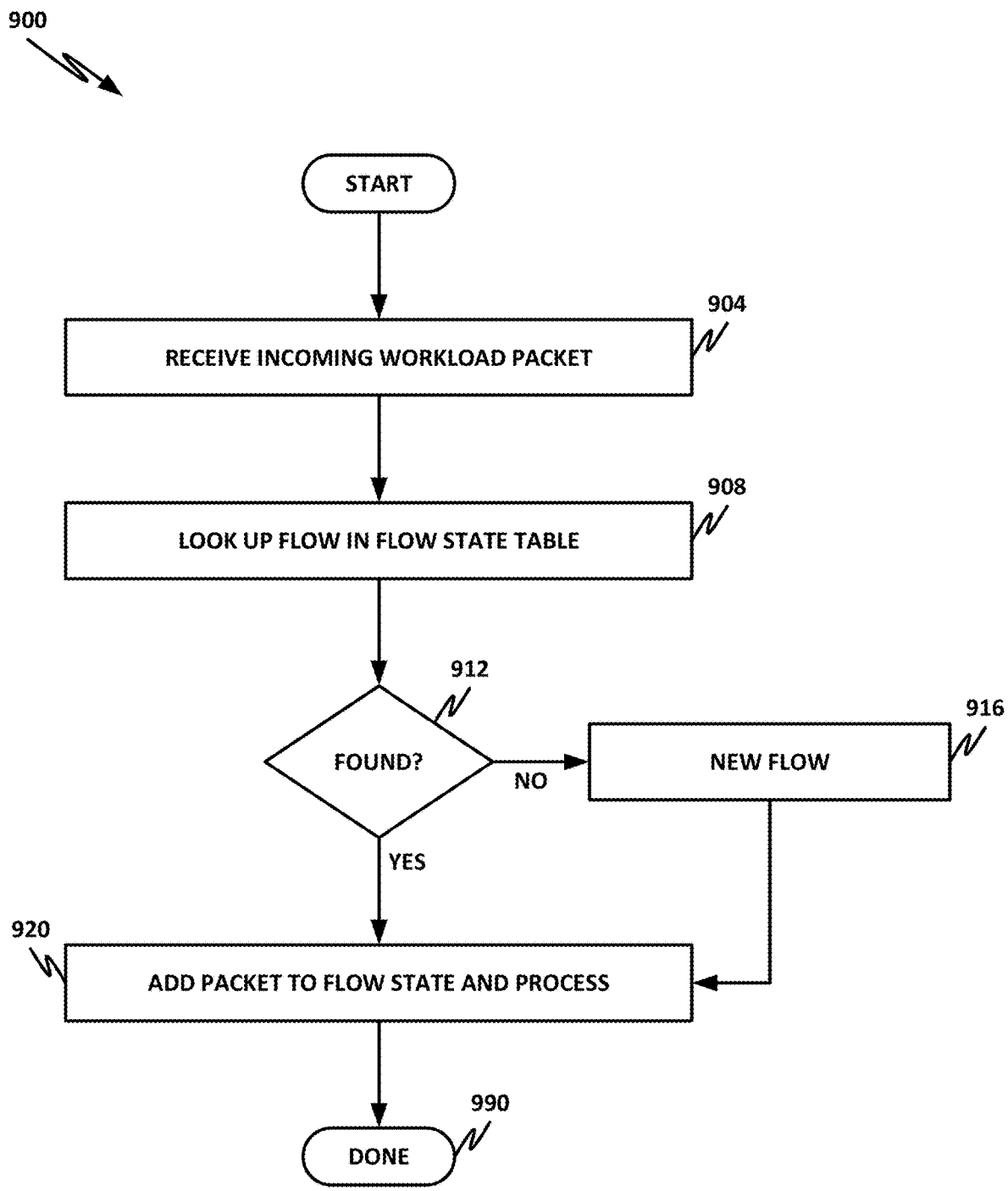
FIG. 9 is a flowchart of an additional method.

FIG. 9 is a flowchart of a method 900. Method 900 illustrates the operation of a workflow. The algorithm provided in FIG. 9 may be performed, for example, by workload service 628 of FIG. 6, or by any other suitable device.

Starting in block 904, the workload service receives an incoming workload packet.

In block 908, the workload service looks up the associated flow in the packet state table. This enables the workload service to maintain state coherency within the flow between packets.

In decision block 912, the system checks whether a flow for the packet was found. If no flow was found, then in block 916, the workload service may create a new flow for the packet.

On the other hand, if a flow is found for the packet, then control proceeds to block 920.

In block 920, either after looking up an existing flow or designating a new flow, the system adds the packet to the flow state, and then processes the packet according to its workflow function. This could include, for example, performing firewall functions, DPI, or other stateful or stateless packet services. In block 990, the method is done.

Figure 10:
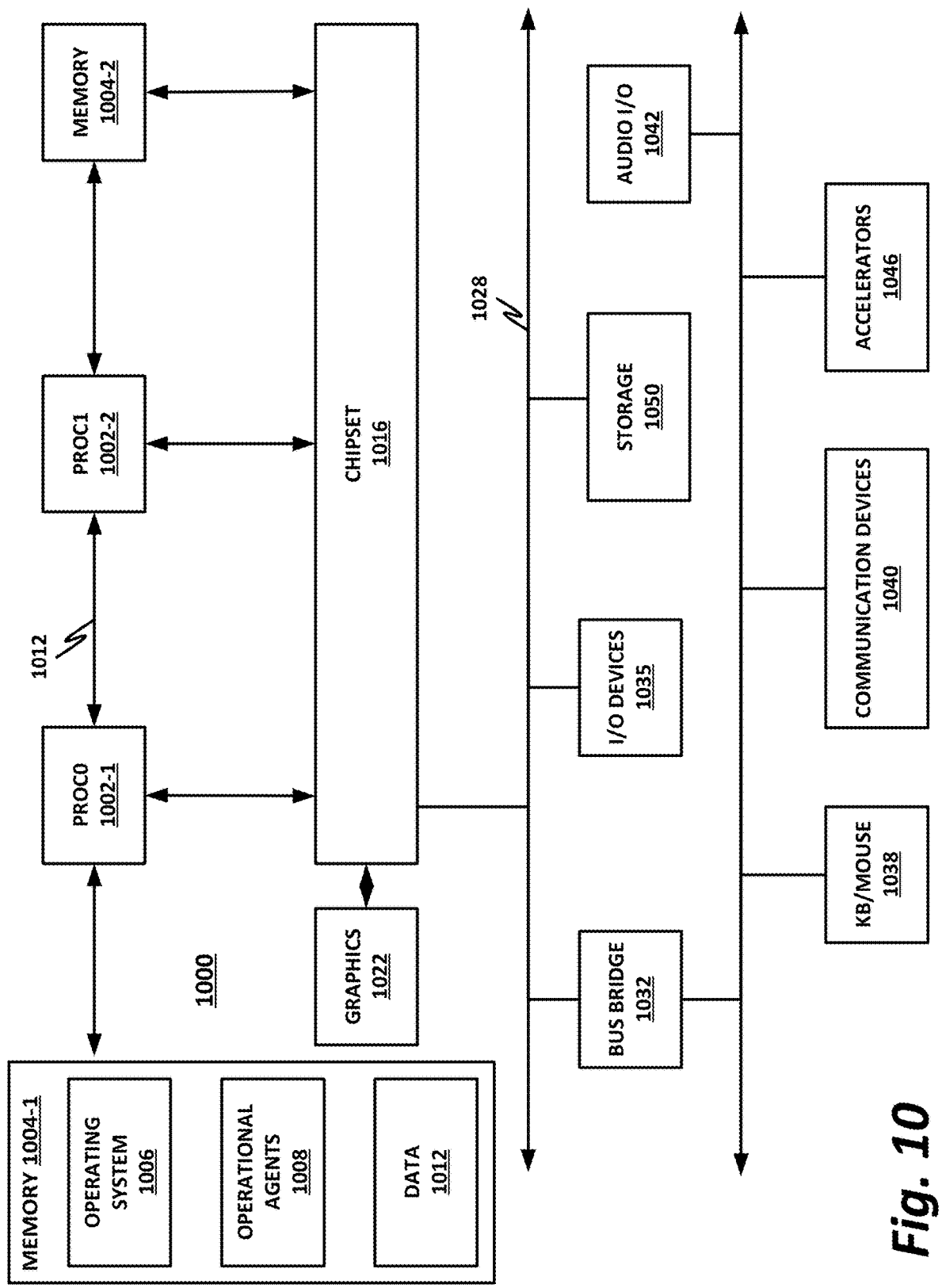
FIG. 10 is a block diagram illustrating selected elements of a hardware platform.

FIG. 10 is a block diagram illustrating a hardware platform 1000. In at least some embodiments, hardware platform 1000 may be configured or adapted to provide synchronization of multi-stack nodes, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1000, even though they may be scattered across a data center, or even located in different data centers.

Hardware platform 1000 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1000 is arranged in a point-to-point (PtP) configuration. This PtP configuration is popular for personal computer (PC) and server-type devices, although it is not so limited, and any other bus type may be used.

Hardware platform 1000 is an example of a platform that may be used to implement embodiments of the teachings of this specification. For example, instructions could be stored in storage 1050. Instructions could also be transmitted to the hardware platform in an ethereal form, such as via a network interface, or retrieved from another source via any suitable interconnect. Once received (from any source), the instructions may be loaded into memory 1004, and may then be executed by one or more processor 1002 to provide elements such as an operating system 1006, operational agents 1008, or data 1012.

Figure 12:
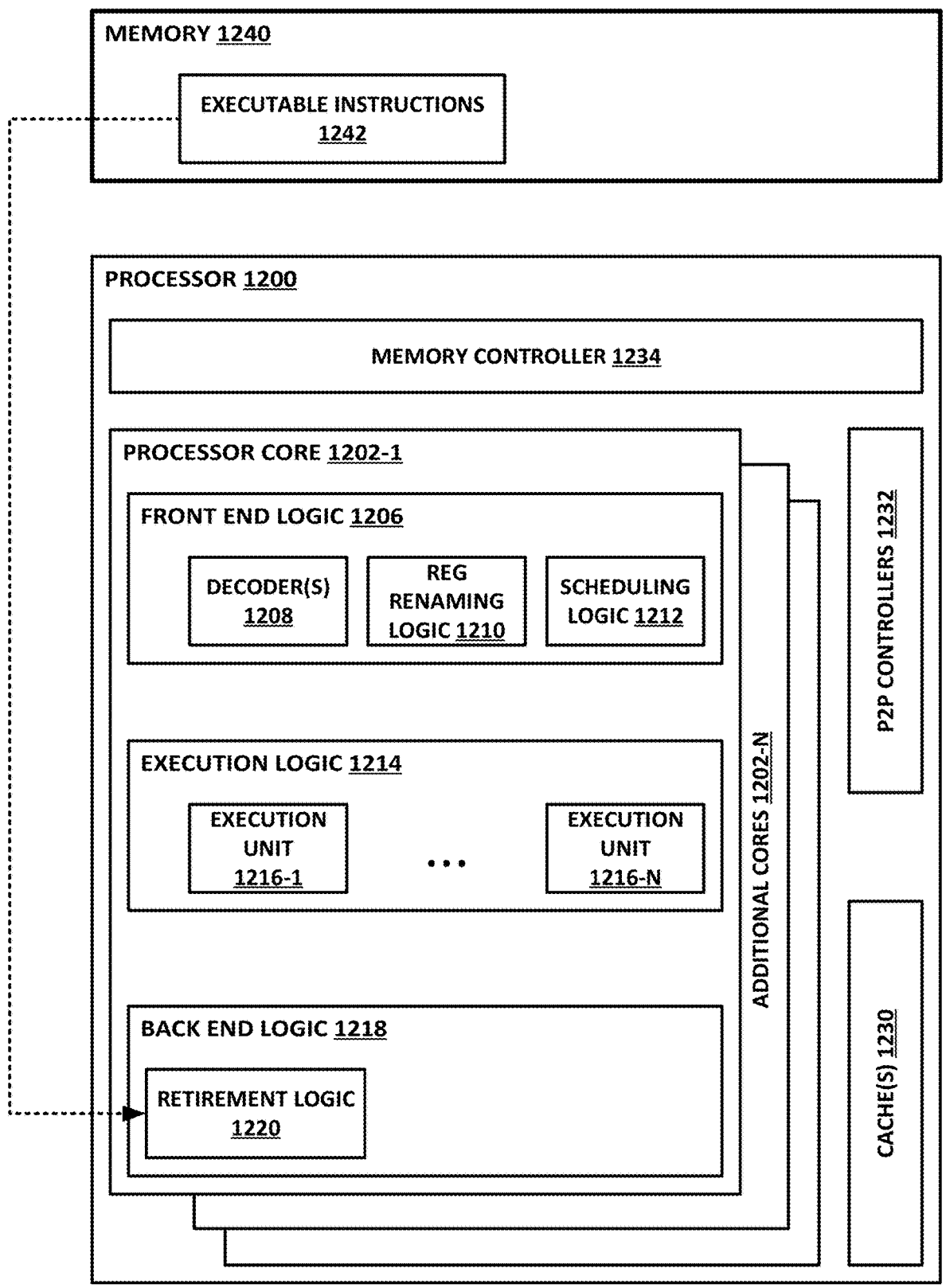
FIG. 12 is a block diagram illustrating selected elements of a processor.

Hardware platform 1000 may include several processors 1002. For simplicity and clarity, only processors PROC0 1002-1 and PROC1 1002-2 are shown. Additional processors (such as 2, 4, 8, 16, 24, 32, 64, or 128 processors) may be provided as necessary, while in other embodiments, only one processor may be provided. Details of processors 1002 are not illustrated in this FIGURE, but one embodiment is illustrated in FIG. 12. Processors may have any number of cores, such as 1, 2, 4, 8, 16, 24, 32, 64, or 128 cores.

Processors 1002 may be any type of processor and may communicatively couple to chipset 1016 via, for example, PtP interfaces. Chipset 1016 may also exchange data with other elements, such as a high performance graphics adapter 1022. In alternative embodiments, any or all of the PtP links illustrated in FIG. 10 could be implemented as any type of bus, or other configuration rather than a PtP link. In various embodiments, chipset 1016 may reside on the same die or package as a processor 1002 or on one or more different dies or packages. Each chipset may support any suitable number of processors 1002. A chipset 1016 (which may be a chipset, uncore, Northbridge, Southbridge, or other suitable logic and circuitry) may also include one or more controllers to couple other components to one or more central processor units (CPUs).

Two memories, 1004-1 and 1004-2 are shown, connected to PROC0 1002-1 and PROC1 1002-2, respectively. As an example, each processor is shown connected to its memory in a direct memory access (DMA) configuration, though other memory architectures are possible, including ones in which memory 1004 communicates with a processor 1002 via a bus. For example, some memories may be connected via a system bus, or in a data center, memory may be accessible in a remote DMA (RDMA) configuration.

Memory 1004 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1004 may be used for short, medium, and/or long-term storage. Memory 1004 may store any suitable data or information utilized by platform logic. In some embodiments, memory 1004 may also comprise storage for instructions that may be executed by the cores of processors 1002 or other processing elements (e.g., logic resident on chipsets 1016) to provide functionality.

In certain embodiments, memory 1004 may comprise a relatively low-latency volatile main memory, while storage 1050 may comprise a relatively higher-latency non-volatile memory. However, memory 1004 and storage 1050 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1004 and storage 1050, for example, in a single physical memory device, and in other cases, memory 1004 and/or storage 1050 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1022 may be configured to provide a human-readable visual output, such as a command-line interface (CLI) or graphical desktop such as Microsoft Windows, Apple OSX desktop, or a Unix/Linux X Window System-based desktop. Graphics adapter 1022 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1022 may include a hardware graphics card, which may have its own memory and its own graphics processing unit (GPU).

Chipset 1016 may be in communication with a bus 1028 via an interface circuit. Bus 1028 may have one or more devices that communicate over it, such as a bus bridge 1032, I/O devices 1035, accelerators 1046, communication devices 1040, and a keyboard and/or mouse 1038, by way of nonlimiting example. In general terms, the elements of hardware platform 1000 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1040 can broadly include any communication not covered by a network interface and the various I/O devices described herein. This may include, for example, various universal serial bus (USB), FireWire, Lightning, or other serial or parallel devices that provide communications.

I/O Devices 1035 may be configured to interface with any auxiliary device that connects to hardware platform 1000 but that is not necessarily a part of the core architecture of hardware platform 1000. A peripheral may be operable to provide extended functionality to hardware platform 1000, and may or may not be wholly dependent on hardware platform 1000. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1042 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1032 may be in communication with other devices such as a keyboard/mouse 1038 (or other input devices such as a touch screen, trackball, etc.), communication devices 1040 (such as modems, network interface devices, peripheral interfaces such as PCI or PCIe, or other types of communication devices that may communicate through a network), audio I/O 1042, and/or accelerators 1046. In alternative embodiments, any portions of the bus architectures could be implemented with one or more PtP links.

Operating system 1006 may be, for example, Microsoft Windows, Linux, UNIX, Mac OS X, iOS, MS-DOS, or an embedded or real-time operating system (including embedded or real-time flavors of the foregoing). In some embodiments, a hardware platform 1000 may function as a host platform for one or more guest systems that invoke application (e.g., operational agents 1008).

Operational agents 1008 may include one or more computing engines that may include one or more non-transitory computer-readable mediums having stored thereon executable instructions operable to instruct a processor to provide operational functions. At an appropriate time, such as upon booting hardware platform 1000 or upon a command from operating system 1006 or a user or security administrator, a processor 1002 may retrieve a copy of the operational agent (or software portions thereof) from storage 1050 and load it into memory 1004. Processor 1002 may then iteratively execute the instructions of operational agents 1008 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1000 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1000 may be virtualized, in particular the processor(s) and memory. For example, a virtualized environment may run on OS 1006, or OS 1006 could be replaced with a hypervisor or virtual machine manager. In this configuration, a virtual machine running on hardware platform 1000 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 10 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 11. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 11:
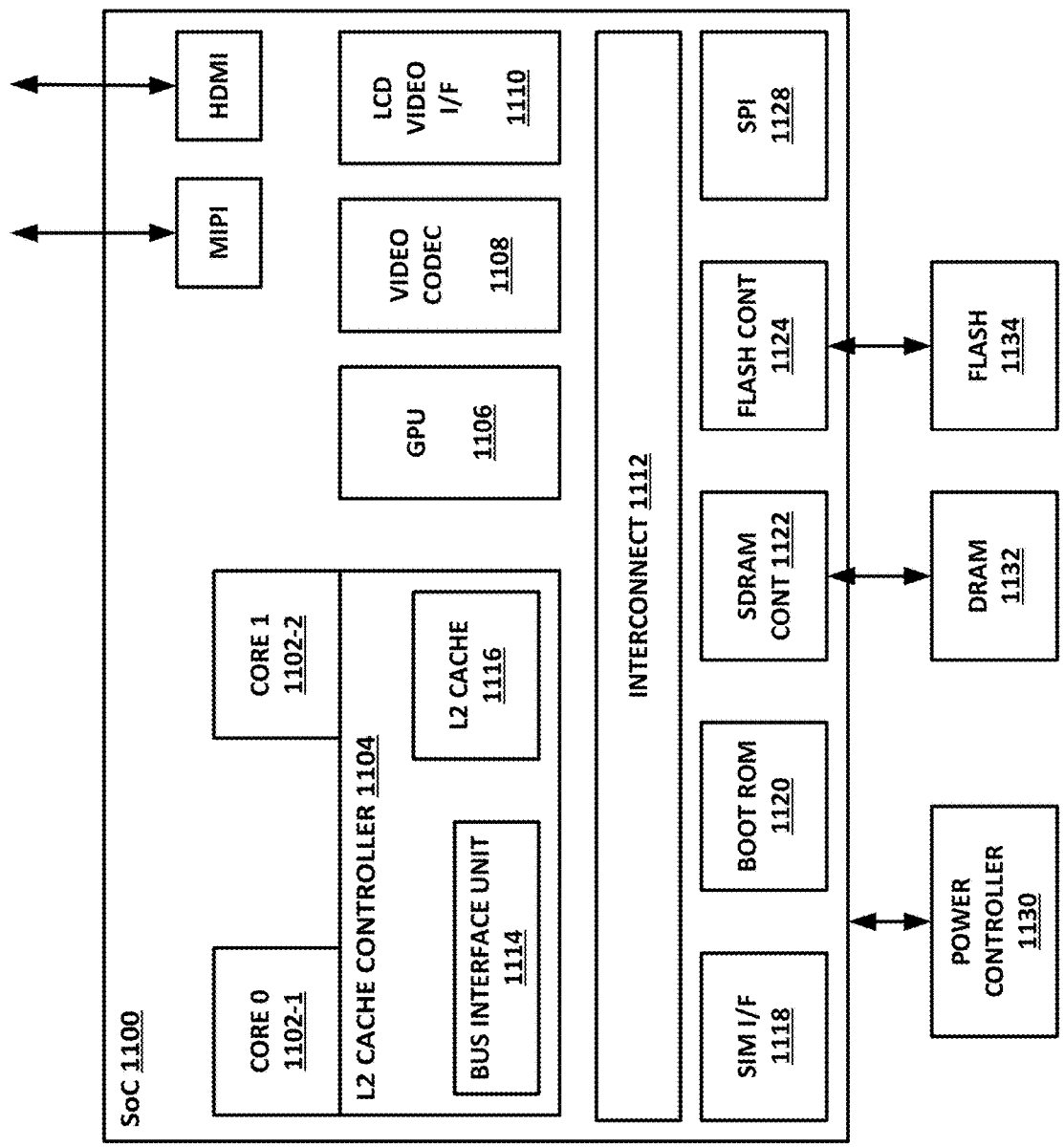
FIG. 11 is a block diagram of selected elements of a system-on-a-chip (SoC).

FIG. 11 is a block illustrating selected elements of an example system-on-a-chip (SoC) 1100. In at least some embodiments, SoC 1100 may be configured or adapted to provide synchronization of multi-stack nodes, according to the teachings of the present specification.

At least some of the teachings of the present specification may be embodied on an SoC 1100, or may be paired with an SoC 1100. SoC 1100 may include, or may be paired with, an advanced reduced instruction set computer machine (ARM) component. For example, SoC 1100 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1100 could also be integrated into, for example, a PC, server, video processing components, laptop computer, notebook computer, netbook, or touch-enabled device.

As with hardware platform 1000 above, SoC 1100 may include multiple cores 1102-1 and 1102-2. In this illustrative example, SoC 1100 also includes an L2 cache control 1104, a GPU 1106, a video codec 1108, a liquid crystal display (LCD) I/F 1110 and an interconnect 1112. L2 cache control 1104 can include a bus interface unit 1114, a L2 cache 1116. Liquid crystal display (LCD) I/F 1110 may be associated with mobile industry processor interface (MIPI)/HDMI links that couple to an LCD.

SoC 1100 may also include a subscriber identity module (SIM) I/F 1118, a boot ROM 1120, a synchronous dynamic random access memory (SDRAM) controller 1122, a flash controller 1124, a serial peripheral interface (SPI) 1128, a suitable power control 1130, a dynamic RAM (DRAM) 1132, and flash 1134. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1100 (or other integrated circuits) may use intellectual property blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 12 is a block diagram illustrating selected elements of a processor 1200. In at least some embodiments, processor 1200 may be configured or adapted to provide synchronization of multi-stack nodes, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1200 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and non-volatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special-purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via NFV, and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple virtual machines (VMs) are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1200 includes one or more processor cores 1202, including core 1202-1-1202-N. Cores 1202 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1200 may include at least one shared cache 1230, which may be treated logically as part of memory 1240. Memory 1240 may include executable instructions 1242, as illustrated. Caches 1230 may be filled according to known caching techniques, and may store instructions and/or data that may be used by one or more components of processor 1200.

Processor 1200 may include an integrated memory controller (MC) 1234, to communicate with memory 1240. Memory controller 1234 may include logic and circuitry to interface with memory 1240, and may also include a cache controller to handle filling and evicting instructions and data to and from cache 1230.

By way of example, each core 1202 may include front-end logic 1206, execution logic 1214, and backend logic 1218.

In the illustrated embodiment, front-end logic 1206 includes an instruction decoder or decoders 1208, register renaming logic 1210, and scheduling logic 1212. Decoder 1208 may decode instructions received. Register renaming logic 1210 may provide register renaming, for example to facilitate pipelining. Scheduling logic 1212 may schedule instruction execution, and may provide out-of-order (OOO) execution. Front-end logic 1206 may fetch incoming instructions, perform various processing (e.g., caching, decoding, branch predicting, etc.), and pass instructions to execution logic 1214.

Execution logic 1214 includes one or more execution units 1216-1-1216-N. Execution units 1216 may include hardware instructions and microcode to carry out the provided instructions.

Backend logic 1218 includes retirement logic 1220. Core 1202 may provide for speculative execution of instructions, branch prediction, and similar. Retirement logic 1220 may be configured to determine which predicted instructions were actually needed by the program flow.

Processor 1200 may also include a PtP controller 1232, which enables connection to an uncore, chipset, Northbridge, Southbridge, or bus, by way of example.

Figure 13:
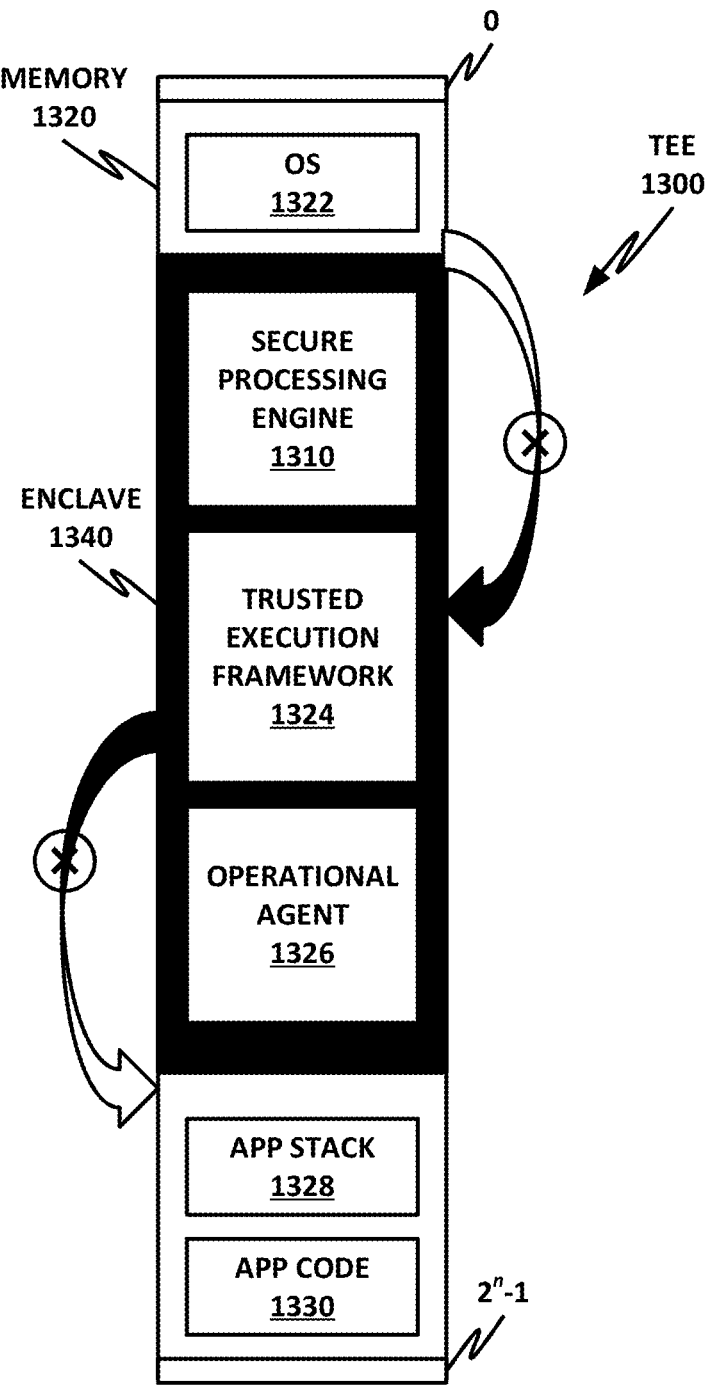
FIG. 13 is a block diagram of selected elements of a trusted execution environment (TEE).

FIG. 13 is a block diagram of a trusted execution environment (TEE) 1300. In some embodiments, synchronization of multi-stack nodes may be performed in deployments that utilize a TEE, according to the teachings of the present specification.

In the example of FIG. 13, memory 1320 is addressable by n-bits, ranging in address from 0 to $2^n-1$ (note, however, that in many cases, the size of the address space may far exceed the actual memory available). Within memory 1320 is an OS 1322, enclave 1340 (including a secure processing engine 1310, a secure execution framework 1324, and an operational agent 1326), application stack 1320, and application code 1330.

In this example, enclave 1340 is a specially-designated portion of memory 1320 that cannot be entered into or exited from except via special instructions, such as Intel Software Guard Extensions (SGX) or similar. Enclave 1340 is provided as an example of a secure environment which, in conjunction with a secure processing engine 1310, forms a TEE 1300 on a hardware platform such as platform 1000 of FIG. 10. A TEE 1300 is a combination of hardware, software, and/or memory allocation that provides the ability to securely execute instructions without interference from outside processes, in a verifiable way. By way of example, TEE 1300 may include memory enclave 1340 or some other protected memory area, and a secure processing engine 1310, which includes hardware, software, and instructions for accessing and operating on enclave 1340. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1310 may be a user-mode application that operates via trusted execution framework 1324 within enclave 1340. TEE 1300 may also conceptually include processor instructions that secure processing engine 1310 and trusted execution framework 1324 require to operate within enclave 1340.

Secure processing engine 1310 and trusted execution framework 1324 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1322 may be excluded from TCB, in addition to the regular application stack 1328 and application code 1330.

In certain systems, computing devices equipped with Intel SGX or equivalent instructions may be capable of providing an enclave 1340. It should be noted, however, that many other examples of TEEs are available, and TEE 1300 is provided only as one example thereof. Other secure environments may include, by way of nonlimiting example, a virtual machine, sandbox, testbed, test machine, or other similar device or method for providing a TEE 1300.

In an example, enclave 1340 provides a protected memory area that cannot be accessed or manipulated by ordinary computer instructions. Enclave 1340 is described with particular reference to an Intel SGX enclave by way of example, but it is intended that enclave 1340 encompass any secure processing area with suitable properties, regardless of whether it is called an "enclave."

One feature of an enclave is that once an enclave region 1340 of memory 1320 is defined, as illustrated, a program pointer cannot enter or exit enclave 1340 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 1340.

Thus, once enclave 1340 is defined in memory 1004, a program executing within enclave 1340 may be safely verified to not operate outside of its bounds. This security feature means that secure processing engine 1310 is verifiably local to enclave 1340. Thus, when an untrusted packet provides its content to be rendered with trusted execution framework 1324 of enclave 1340, the result of the rendering is verified as secure.

Enclave 1340 may also digitally sign its output, which provides a verifiable means of ensuring that content has not been tampered with or modified since being rendered by secure processing engine 1310. A digital signature provided by enclave 1340 is unique to enclave 1340 and is unique to the hardware of the device hosting enclave 1340.

Figure 14:
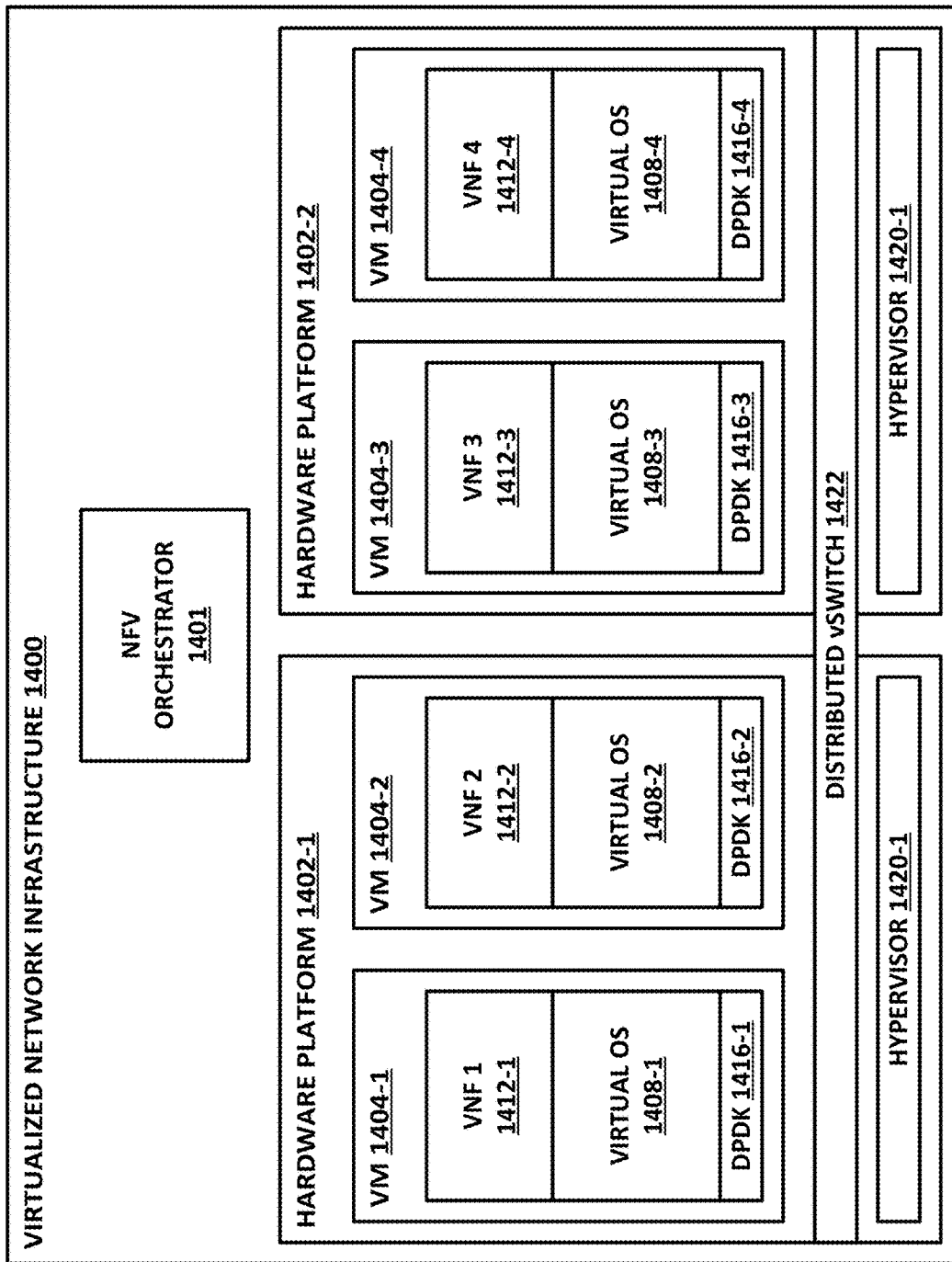
FIG. 14 is a block diagram of selected elements of a network function virtualization (NFV) infrastructure.

FIG. 14 is a block diagram of a network function virtualization (NFV) infrastructure 1400. In some embodiments, synchronization of multi-stack nodes may be performed within an NFV infrastructure, according to the teachings of the present specification.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or DPI appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 14, an NFV orchestrator 1401 manages a number of the VNFs 1412 running on an NFVI 1400. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1401 a valuable system resource. Note that NFV orchestrator 1401 may provide a browser-based or graphical configuration interface, and in some embodiments may be integrated with SDN orchestration functions.

Note that NFV orchestrator 1401 itself may be virtualized (rather than a special-purpose hardware appliance). NFV orchestrator 1401 may be integrated within an existing SDN system, wherein an operations support system (OSS) manages the SDN. This may interact with cloud resource management systems (e.g., OpenStack) to provide NFV orchestration. An NFVI 1400 may include the hardware, software, and other infrastructure to enable VNFs to run. This may include a hardware platform 1402 on which one or more VMs 1404 may run. For example, hardware platform 1402-1 in this example runs VMs 1404-1 and 1404-2. Hardware platform 1402-2 runs VMs 1404-3 and 1404-4. Each hardware platform may include a hypervisor 1420, virtual machine manager (VMM), or similar function, which may include and run on a native (bare metal) operating system, which may be minimal so as to consume very few resources.

Hardware platforms 1402 may be or comprise a rack or several racks of blade or slot servers (including, e.g., processors, memory, and storage), one or more data centers, other hardware resources distributed across one or more geographic locations, hardware switches, or network interfaces. An NFVI 1400 may also include the software architecture that enables hypervisors to run and be managed by NFV orchestrator 1401.

Running on NFVI 1400 are a number of VMs 1404, each of which in this example is a VNF providing a virtual service appliance. Each VM 1404 in this example includes an instance of the Data Plane Development Kit (DPDK), a virtual operating system 1408, and an application providing the VNF 1412.

Virtualized network functions could include, as nonlimiting and illustrative examples, firewalls, intrusion detection systems, load balancers, routers, session border controllers, DPI services, network address translation (NAT) modules, or call security association.

The illustration of FIG. 14 shows that a number of VNFs 1404 have been provisioned and exist within NFVI 1400. This FIGURE does not necessarily illustrate any relationship between the VNFs and the larger network, or the packet flows that NFVI 1400 may employ.

The illustrated DPDK instances 1416 provide a set of highly-optimized libraries for communicating across a virtual switch (vSwitch) 1422. Like VMs 1404, vSwitch 1422 is provisioned and allocated by a hypervisor 1420. The hypervisor uses a network interface to connect the hardware platform to the data center fabric (e.g., an HFI). This HFI may be shared by all VMs 1404 running on a hardware platform 1402. Thus, a vSwitch may be allocated to switch traffic between VMs 1404. The vSwitch may be a pure software vSwitch (e.g., a shared memory vSwitch), which may be optimized so that data are not moved between memory locations, but rather, the data may stay in one place, and pointers may be passed between VMs 1404 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1422 is illustrated, wherein vSwitch 1422 is shared between two or more physical hardware platforms 1402.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile random access memory (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a method of a work node synchronously load balancing to a multi-node service having an expected maximum of n work nodes, comprising: provisioning a flow table having m bucket groups, m≥1, the bucket groups comprising n slots each; enumerating a static integer self-identification $id_0$; initializing the flow table with $id_0$ in each slot; performing a discovery iteration, comprising: discovering a peer device; enumerating a static integer identification $id_x$ for the peer device; assigning $id_x$ to each slot corresponding to a home position for the peer device; and load balancing slots not assigned to a home position according to a deterministic algorithm; and discovering additional nodes and performing discovery iteration for the additional nodes.

There is further disclosed an example method, wherein the home position for a device is at a numerical offset within the bucket group that corresponds to $id_x$.

There is further disclosed an example method, wherein the deterministic algorithm comprises cycling through static integer identifications of discovered devices.

There is further disclosed an example method, wherein the deterministic algorithm comprises cycling through static integer identifications of discovered devices in ascending numerical order.

There is further disclosed an example method, further comprising providing a network security service.

There is further disclosed an example method, wherein the network security service is a stateful flow-based service.

There is further disclosed an example method, wherein the work nodes are substantially identical.

There is further disclosed an example method, wherein the work nodes share a common trunk.

There is further disclosed an example method, wherein the work nodes are arranged in a dual stack.

There is further disclosed an example method, wherein the dual stack comprises a primary stack and a failover stack.

There is further disclosed an example method, wherein the work nodes provide a primary ingress path and a redundant ingress path.

There is further disclosed an example method, wherein n=4.

There is further disclosed an example method, wherein n=8.

There is further disclosed an example method, wherein the work nodes provide deep packet inspection.

There is further disclosed an example apparatus, comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of any a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

There is also disclosed an example load balancer configured to operate in a multi-node workload environment, comprising: a hardware platform comprising a processor and a memory; a network interface comprising an ingress port and a plurality of egress ports; and instructions encoded within the memory to instruct the processor to: provision a flow table comprising a plurality of m groups having n slots per group, m>1 and n>1; enumerate an integer self-identification $id_0$, wherein $1 \leq id\_0 \leq n$; initialize the slots in the flow table to $id_0$; discover a new destination node having an integer identification $id_x, 1 \leq id_x \leq n$; and within the m groups, set an $id_x^{th}$ slot to $id_x$.

There is further disclosed an example load balancer, wherein the instructions are further to load balance slots where a slot position does not correspond to the integer identification.

There is further disclosed an example load balancer, wherein the instructions are further to load balance slots where a slot position does not correspond to the integer identification, comprising stepping through discovered node integer identifications in ascending numerical order.

There is further disclosed an example load balancer, wherein the home position for a device is at a numerical offset within the bucket group that corresponds to $id_x$.

There is further disclosed an example load balancer, wherein the instructions are further to apply a deterministic algorithm, wherein the deterministic algorithm comprises cycling through static integer identifications of discovered devices.

There is further disclosed an example load balancer, wherein the deterministic algorithm comprises cycling through static integer identifications of discovered devices in ascending numerical order.

There is further disclosed an example load balancer, further comprising a network security service.

There is further disclosed an example load balancer, wherein the network security service is a stateful flow-based service.

There is further disclosed an example load balancer, wherein the nodes are substantially identical.

There is further disclosed an example load balancer, wherein the nodes share a common trunk.

There is further disclosed an example load balancer, wherein the nodes are arranged in a dual stack.

There is further disclosed an example load balancer, wherein the dual stack comprises a primary stack and a failover stack.

There is further disclosed an example load balancer, wherein the nodes provide a primary ingress path and a redundant ingress path.

There is further disclosed an example load balancer, wherein n=4.

There is further disclosed an example load balancer, wherein n=8.

There is further disclosed an example load balancer, wherein the nodes provide deep packet inspection.

There is also disclosed an example of one or more tangible, non-transitory computer-readable storage media comprising instructions to: join a multi-node service cluster; receive a numeric identifier; populate a flow table with the numeric identifier; discover a new node in the cluster; receive a second numeric identifier for the new node; assign the second numeric identifier to one or more home positions for the second numeric identifier within the flow table; load balance remaining positions within the flow table; and upon discovering another new node in the cluster, repeat the receive-assign-load balance sequence for the other new node.

There is further disclosed an example of one or more tangible, non-transitory computer-readable storage media, wherein load balancing the remaining positions is according to a deterministic algorithm.

There is further disclosed an example of one or more tangible, non-transitory computer-readable storage media, wherein the deterministic algorithm comprises sequentially filling non-home positions with sequentially numeric identifiers of discovered nodes in ascending numerical order.

There is further disclosed an example of one or more tangible, non-transitory computer-readable storage media, wherein the deterministic algorithm further comprises cycling back to the smallest numeric identifier.

There is further disclosed an example of one or more tangible, non-transitory computer-readable storage media, wherein the home position for a device is at a numerical offset within a bucket group that corresponds to a numeric identifier for that node.

There is further disclosed an example of one or more tangible, non-transitory computer-readable storage media, wherein load balancing remaining positions within the flow table comprises applying a deterministic algorithm, wherein the deterministic algorithm comprises cycling through static integer identifications of discovered devices.

There is further disclosed an example of one or more tangible, non-transitory computer-readable storage media, wherein the deterministic algorithm comprises cycling through static integer identifications of discovered devices in ascending numerical order.

There is further disclosed an example of one or more tangible, non-transitory computer-readable storage media, wherein the instructions are further to provide a network security service.

There is further disclosed an example of one or more tangible, non-transitory computer-readable storage media, wherein the network security service is a stateful flow-based service.

There is further disclosed an example of one or more tangible, non-transitory computer-readable storage media, wherein the new nodes are substantially identical.

There is further disclosed an example of one or more tangible, non-transitory computer-readable storage media, wherein the new nodes share a common trunk.

There is further disclosed an example of one or more tangible, non-transitory computer-readable storage media, wherein the new nodes are arranged in a dual stack.

There is further disclosed an example of one or more tangible, non-transitory computer-readable storage media, wherein the dual stack comprises a primary stack and a failover stack.

There is further disclosed an example of one or more tangible, non-transitory computer-readable storage media, wherein the new nodes provide a primary ingress path and a redundant ingress path.

There is further disclosed an example of one or more tangible, non-transitory computer-readable storage media, wherein n=4.

There is further disclosed an example of one or more tangible, non-transitory computer-readable storage media, wherein n=8.

There is further disclosed an example of one or more tangible, non-transitory computer-readable storage media, wherein the new nodes provide deep packet inspection.

There is also disclosed an example network service cluster sharing a common trunk comprising a plurality of service nodes, wherein the service nodes are programmed to maintain independent flow tables for load balancing, wherein the independent flow tables are to converge over time according to a deterministic algorithm wherein each node initially populates its flow table with its own numeric identifier, discovers other nodes, and for each discovered node assigns a numeric identifier for the discovered node to a home position for that numeric identifier, and then load balances remaining positions in the flow table between discovered nodes.

There is further disclosed an example network service cluster, wherein the home position for a device is at a numerical offset within the bucket group that corresponds to the device's identification.

There is further disclosed an example network service cluster, wherein the deterministic algorithm comprises cycling through static integer identifications of discovered devices.

There is further disclosed an example network service cluster, wherein the deterministic algorithm comprises cycling through static integer identifications of discovered devices in ascending numerical order.

There is further disclosed an example network service cluster, wherein the nodes further provide a network security service.

There is further disclosed an example network service cluster, wherein the network security service is a stateful flow-based service.

There is further disclosed an example network service cluster, wherein the service nodes are substantially identical.

There is further disclosed an example network service cluster, wherein the service nodes share a common trunk.

There is further disclosed an example network service cluster, wherein the service nodes are arranged in a dual stack.

There is further disclosed an example network service cluster, wherein the dual stack comprises a primary stack and a failover stack.

There is further disclosed an example network service cluster, wherein the service nodes provide a primary ingress path and a redundant ingress path.

There is further disclosed an example network service cluster, wherein n=4.

There is further disclosed an example network service cluster, wherein n=8.

There is further disclosed an example network service cluster, wherein the service nodes provide deep packet inspection.

What is claimed is:

1. A method of a work node synchronously load balancing to a multi-node service having an expected maximum of n work nodes, comprising:
provisioning a flow table having m bucket groups, $m \geq 1$, the bucket groups comprising n slots each;
enumerating a static integer self-identification $id_0$;
initializing the flow table with $id_0$ in each slot;
performing a discovery iteration, comprising:
discovering a peer device;
enumerating a static integer identification $id_x$ for the peer device;
assigning $id_x$ to each slot corresponding to a home position for the peer device; and
load balancing slots not assigned to a home position according to a deterministic algorithm; and
discovering additional nodes and performing discovery iterations for the additional nodes.

2. The method of claim 1, wherein the home position for a device is at a numerical offset within the bucket group that corresponds to $id_x$.

3. The method of claim 1, wherein the deterministic algorithm comprises cycling through static integer identifications of discovered devices in ascending numerical order.

4. One or more tangible, non-transitory computer-readable storage media comprising instructions to:
join a multi-node service cluster of up to n nodes;
receive a static numeric identifier;
fully populate a flow table with the static numeric identifier, wherein the flow table has n slots;
discover a new node in the cluster;
receive a second static numeric identifier for the new node;
assign the second static numeric identifier to one or more home positions for the second numeric identifier within the flow table, wherein the one or more home positions are reserved for the second static numeric identifier;
load balance remaining positions within the flow table according to a deterministic method; and
upon discovering another new node in the cluster, repeat the receive-assign-load balance sequence for the other new node.

5. The one or more tangible, non-transitory computer-readable storage media of claim 4, wherein load balancing the remaining positions is according to a deterministic algorithm.

6. The one or more tangible, non-transitory computer-readable storage media of claim 5, wherein the deterministic algorithm comprises sequentially filling non-home positions with sequentially numeric identifiers of discovered nodes in ascending numerical order.

7. The one or more tangible, non-transitory computer-readable storage media of claim 6, wherein the deterministic algorithm further comprises cycling back to a smallest numeric identifier.

8. The one or more tangible, non-transitory computer-readable storage media of claim 4, wherein the home position for a device is at a numerical offset within a bucket group that corresponds to a numeric identifier for that node.

9. The one or more tangible, non-transitory computer-readable storage media of claim 4, wherein load balancing remaining positions within the flow table comprises applying a deterministic algorithm, wherein the deterministic algorithm comprises cycling through static integer identifications of discovered devices.

10. The one or more tangible, non-transitory computer-readable storage media of claim 9, wherein the deterministic algorithm comprises cycling through static integer identifications of discovered devices in ascending numerical order.

11. The one or more tangible, non-transitory computer-readable storage media of claim 4, wherein the instructions are further to provide a network security service.

12. The one or more tangible, non-transitory computer-readable storage media of claim 11, wherein the network security service is a stateful flow-based service.

13. The one or more tangible, non-transitory computer-readable storage media of claim 4, wherein the new nodes are substantially identical.

14. The one or more tangible, non-transitory computer-readable storage media of claim 4, wherein the new nodes share a common trunk.

15. The one or more tangible, non-transitory computer-readable storage media of claim 4, wherein the new nodes are arranged in a dual stack, comprising a primary stack and a failover stack.

16. The one or more tangible, non-transitory computer-readable storage media of claim 4, wherein $n=4$.

17. The one or more tangible, non-transitory computer-readable storage media of claim 4, wherein the nodes provide deep packet inspection.

18. A network service cluster comprising at least one hardware platform comprising a processor and a memory, and sharing a common trunk comprising a plurality of service nodes, wherein the service nodes are programmed to maintain independent flow tables for load balancing, wherein the independent flow tables have a number of slots corresponding to a number of nodes in the network service cluster and are to converge over time according to a deterministic algorithm wherein each node initially fully populates its flow table with its own numeric identifier, discovers other nodes, and for each discovered node assigns a numeric identifier for the discovered node to a home position for that numeric identifier, and then load balances remaining positions in the flow table between discovered nodes.

19. The network service cluster of claim 18, wherein the home position for a device is at a numerical offset within a bucket group that corresponds to the device's identification.

20. The network service cluster of claim 18, wherein the deterministic algorithm comprises cycling through static integer identifications of discovered devices.

* * * * *

UNITED STATES PATENT AND TRADEMARK OFFICE
CERTIFICATE OF CORRECTION

| | | |
|---|---|---|
| PATENT NO. | : 11,671,371 B2 | Page 1 of 1 |
| APPLICATION NO. | : 16/941877 | |
| DATED | : June 6, 2023 | |
| INVENTOR(S) | : Abraham et al. | |

It is certified that error appears in the above-identified patent and that said Letters Patent is hereby corrected as shown below:

In the Drawings

Sheet 6 of 14, in "Fig. "6", Tag "636", delete "flow state table" and insert -- packet state table --, therefor.

In the Claims

In Column 35, Claim 1, Line 15, delete "a home piston" and insert -- the home piston --, therefor.

In Column 35, Claim 5, Line 45, delete "a deterministic" and insert -- the deterministic --, therefor.

Signed and Sealed this
First Day of August, 2023

Katherine Kelly Vidal
*Director of the United States Patent and Trademark Office*